(12) United States Patent
Crippa et al.

(10) Patent No.: US 12,129,898 B2
(45) Date of Patent: Oct. 29, 2024

(54) PAD-AND-SPRING ASSEMBLY FOR A BRAKE CALIPER

(71) Applicant: BREMBO S.p.A., Curno (IT)

(72) Inventors: Cristian Crippa, Curno (IT); Marco Fumagalli, Curno (IT); Mauro Mambretti, Curno (IT); Andrea Mecocci, Curno (IT)

(73) Assignee: Brembo S.p.A., Bergamo (IT)

( * ) Notice: Subject to any disclaimer, the term of this patent is extended or adjusted under 35 U.S.C. 154(b) by 721 days.

(21) Appl. No.: 17/415,233

(22) PCT Filed: Dec. 9, 2019

(86) PCT No.: PCT/IB2019/060550
§ 371 (c)(1),
(2) Date: Jun. 17, 2021

(87) PCT Pub. No.: WO2020/128710
PCT Pub. Date: Jun. 25, 2020

(65) Prior Publication Data
US 2022/0065312 A1 Mar. 3, 2022

(30) Foreign Application Priority Data
Dec. 20, 2018 (IT) .......................... 102018000020572

(51) Int. Cl.
*F16D 65/097* (2006.01)
*F16D 55/226* (2006.01)
(Continued)

(52) U.S. Cl.
CPC ....... *F16D 65/0972* (2013.01); *F16D 55/226* (2013.01); *F16D 65/0075* (2013.01);
(Continued)

(58) Field of Classification Search
None
See application file for complete search history.

(56) References Cited

U.S. PATENT DOCUMENTS

| 3,783,980 A | * | 1/1974 | Kallmeyer | .......... F16D 65/0977 |
| | | | | 188/73.38 |
| 4,527,669 A | * | 7/1985 | Meyer | ................. F16D 65/0976 |
| | | | | 188/73.38 |

(Continued)

FOREIGN PATENT DOCUMENTS

| DE | 102017222639 A1 | 8/2018 |
| EP | 0716246 A1 | 6/1996 |

(Continued)

OTHER PUBLICATIONS

European Patent Office, International Search Report with Written Opinion, issued in PCT/IB2019/060550, Feb. 25, 2020, 13 pages, European Patent Office, Rijswijk, Netherlands.

*Primary Examiner* — Melanie Torres Williams
(74) *Attorney, Agent, or Firm* — Marshall & Melhorn, LLC

(57) ABSTRACT

A pad-and-spring assembly has a supporting plate supporting friction material. The supporting plate has a disc facing surface, a plate back, and facing thrust structure. The friction material has a radially inner edge, and a radially outer edge, radially opposite to the radially inner edge, and defining the outer radial dimension level of the friction material with its tangential extension on the disc facing surface. The disc facing surface has a free surface located radially inside with respect to the tangential extension of the radially outer edge of the friction and having a through opening edge delimiting a through opening. An elastic device of the assembly has a body having at least one connecting portion, connecting to the body of the brake caliper and a supporting portion, axially crossing the through opening to apply elastic biasing (Continued)

action directly in axial direction to the through opening edge.

17 Claims, 13 Drawing Sheets

(51) Int. Cl.
  *F16D 65/00* (2006.01)
  *F16D 55/00* (2006.01)
  *F16D 127/02* (2012.01)
(52) U.S. Cl.
  CPC .... *F16D 65/0977* (2013.01); *F16D 2055/002* (2013.01); *F16D 2055/0029* (2013.01); *F16D 2127/02* (2013.01)

(56) References Cited

U.S. PATENT DOCUMENTS

| | | | |
|---|---|---|---|
| 6,634,469 | B2 | 10/2003 | Storzel et al. |
| 9,388,870 | B2 | 7/2016 | Cesani et al. |
| 10,156,274 | B2 | 12/2018 | Crippa et al. |
| 10,316,912 | B2 | 6/2019 | Crippa et al. |
| 10,378,598 | B2 | 8/2019 | Scotti et al. |
| 2010/0187050 | A1* | 7/2010 | Hayashi ............. F16D 66/02 188/72.3 |
| 2014/0305753 | A1 | 10/2014 | Macy et al. |
| 2015/0323024 | A1 | 11/2015 | Crippa et al. |
| 2018/0328427 | A1 | 11/2018 | Scotti et al. |
| 2019/0338816 | A1 | 11/2019 | Denhard et al. |

FOREIGN PATENT DOCUMENTS

| | | |
|---|---|---|
| JP | 2012189188 A | 10/2012 |
| WO | WO 92/18785 A1 | 10/1992 |
| WO | WO 2011/018815 A1 | 2/2011 |
| WO | WO 2014/097098 A1 | 6/2014 |
| WO | WO 2015/155708 A1 | 10/2015 |
| WO | WO 2017/085619 A1 | 5/2017 |

* cited by examiner

PAD-AND-SPRING ASSEMBLY FOR A BRAKE CALIPER

CROSS-REFERENCE TO RELATED APPLICATIONS

This application is a National Phase Application of PCT International Application No. PCT/IB2019/060550, having an International Filing Date of Dec. 9, 2019, which claims priority to Italian Application No. 102018000020572 filed Dec. 20, 2018, each of which is hereby incorporated by reference in its entirety.

FIELD OF THE INVENTION

The present invention relates to a pad-and-spring assembly for a brake caliper.

Furthermore, the present invention relates to a brake caliper for a disc brake comprising said assembly.

BACKGROUND ART

In a disc brake, the brake caliper is generally arranged straddling the outer peripheral margin of a brake disc, adapted to rotate about a rotation axis defining an axial direction (X-X). In a disc brake, a radial direction (R-R), which is substantially orthogonal to said axial direction (X-X), and a tangential (T-T) or circumferential direction (T-T), orthogonal to both said axial direction (X-X) and said radial direction (R-R), is further defined.

Brake pads generally comprise a pad onto which friction material is fixed, adapted to press against a facing braking surface of the braking band of the brake disc. The plate may comprise auditory wear indicators, sometimes embedded in the friction material, which have the function of emitting a sound, by rubbing against the brake band of the disc when the friction material has thinned axially due to prolonged use.

The axial (X-X), radial (R-R) and tangential (T-T) or circumferential (T-T) directions are defined on a brake pad, also when it is in a configuration not installed on a brake caliper and it is, for example, associated with at least one elastic device.

A known type of pad is the so-called pad of the type hanging on pins, which provides eyelets made in the pad plate and adapted to receive pins specifically envisaged in the body of the caliper and intended to sustain the pad, in which the braking action is transmitted from the material to the plate which surrounds said eyelets to the caliper body.

A different type of pad is the so-called pad of the type resting on the caliper body, which is accommodated in a specific pocket obtained in the caliper body, in which the braking action is transmitted by a side of the pad plate to the caliper body when said plate side abuts against a facing abutment surface of the caliper body pocket, at the beginning of the vehicle braking action. The pins associated with this type of pads act as sliding axial guides, to guide the approaching movement of the pads to the disc and the distancing of the pads from the disc.

Typically, the caliper body is made of metal, such as aluminum, or aluminum alloy, such as aluminum and lithium, or steel, and can be obtained by casting, but also by machining by chip forming techniques, as well as by forging.

In floating caliper bodies associated with fixed discs, a floating portion of the caliper body has a cylinder, or cylinders, adapted to accommodate hydraulic pistons capable of applying a thrust action on the pads facing it, making it abut against the braking surface of the disc, while it slides on the bracket, or fixed portion of the caliper, and acts on the second clutch pad making it abut against the opposite brake disc surface to apply the braking action on the vehicle.

In the known caliper bodies associated with fixed discs, a cylinder or cylinders is or are present on both the axially opposite sides of the caliper body adapted to accommodate pistons, preferably hydraulic pistons, capable of applying a thrust action on the brake pads to make them abut against the respective facing disc braking surfaces to apply the braking action on the vehicle.

The pressure applied by the vehicle driver on the brake pedal applies a brake fluid pressure which through a pipe is applied to the brake fluid present in the hydraulic circuit placed inside the caliper body to reach the cylinders, where the pressure is applied onto the bottom surface of the pistons, thus forcing them to close against the brake pads, which in turn abut against the braking surfaces of the disc.

The caliper body deforms as a function of the torque applied by the action of the pistons which make the pads abut against the braking surfaces of the disc, applied in directions which form torque arms with respect to the fixing points of the caliper body to its support. These torques deform the caliper body also in a tangential and radial direction with respect to the disc, as well as axially, causing an increase in the piston stroke and therefore an increase in the stroke of the brake system control pedal.

When the braking action ceases, the caliper body returns to its undeformed configuration, approaching the braking surfaces of the disc and at the same time the piston of the cylinder-piston assembly receives a thrust away from the disc by means of the action of piston retraction devices, usually seals integrated in the dust boot of the piston as shown in documents US-2013-192936 and US-2014-231190 by the Applicant.

Typically, such piston retraction devices (known as roll-back devices) are provided at the interface between piston and respective cylinder and are designed to retract the piston inside its cylinder by a limited predefined amount, moving away from the respective pad when the braking control ceases.

In this situation, the approaching of the caliper body to the disc is undesired because it determines a contact, albeit minor, between brake pads and disc braking surfaces, which determines continuous minor friction and thus a braking action, also known as residual braking torque, also when the braking command ceases.

Such a residual braking torque is often considered undesired because it generates noise, albeit minor, caused by the friction action between pads and disc braking surfaces, an undesired wear of the pads and of the brake disc, and implies more frequent maintenance for their replacement, and a minimum fuel consumption for feeding the drive unit with the energy, even if minimum, needed to overcome this residual torque.

For such a reason, it is known to associate spring brake pads which, by cooperating with parts of the brake caliper body, apply a direct bias in axial direction (X-X) on the brake pads to move them away from the brake disc when the braking action ceases, making them abut against the pistons already retracted by the roll-back devices. During the step of braking, such a biasing action away from the disc is overcome by the thrust action applied by the pistons. On the other hand, during the step of releasing, i.e. when the braking action ceases, such springs apply an axial thrust (X-X) aimed at moving the pads away from the braking surfaces of the brake disc, thereby avoiding the contact between the pads and the brake disc when no braking action is required.

For example, document WO-2015-155708 by the Applicant shows a cross-shaped spring solution coupled on top to the bridge of the caliper body arranged straddling the disc and provided with favorably inclined portions adapted to press against radially outer portions of the brake pads to move them away from the disc. Such a spring exploits the same inclined portions also to push the brake pad radially by acting on the radially outer edge of the brake pad. Cross-shaped springs coupled to the caliper bridge of this type require to act on the radially outer edge of the brake pad, necessarily providing a localized axial thrust which may cause a misalignment of the pads with respect to the braking surfaces of the disc facing them which, in order to be compensated, generates an uneven wear of the friction material of the pads, thus limiting the service life of the brake pads.

Solutions of springs working on side extensions which extend tangentially from the sides of the brake pad, are also known, as shown for example in document US-2014-0305753, in which the spring leaf is folded so as to couple the brake pad with one end and the body of the caliper with the opposite end, extending with the portion folded tangentially to the side of the plate. Such solutions require an increased dimension in the tangential direction next to the pad both to accommodate the ears of the pad and to accommodate the folded portion of the spring, necessarily requiring to reserve volumes of free space in the body of the caliper tangentially next to the pad.

Another known type of spring, shown for example in EP-0716246 and WO-92-18785, is located on the back of the brake pad and comprises a leaf-shaped body which alternatively couples to the piston or undercut against an elongated vehicle-wheel-facing portion of the caliper body of a floating brake caliper. For example, document US-2002-096404 shows a leaf-shaped spring solution adapted to be coupled in undercut manner against walls of an annular groove provided in the piston.

A further spring solution which can be associated by positive coupling with the piston is shown in document US-2015-323024 by the Applicant, which discloses a spring solution comprising a plurality of petals adapted to press, when they are inserted into a respective substantially cylindrical lightening cavity of the piston, against the axial walls of such a cavity.

Spring solutions coupled to the piston body have the advantage of providing an elastic biasing action to the brake pad applied in the back zone of the pad in which it presses the one or more pistons, and therefore offer the possibility of acting substantially on the barycenter of the brake pad.

However, such known solutions are by no means free from drawbacks, because they reduce the contact area between the back of the brake pad and the facing thrust means, e.g. a piston of a cylinder-piston assembly. Furthermore, such springs coupled to the piston necessarily limit the cooling capacity of the piston and thus of the brake fluid housed in the cylinder. Furthermore, such springs can damage the dust boot which protects the cylinder-piston assembly from the penetration of dust and impurities, thus requiring frequent maintenance.

The need is strongly felt to provide a spring solution to move the brake pad away from the braking surface of the disc when the braking action ceases and to make it abut against the piston which is adapted to keep the pad substantially parallel to the braking surface of the brake disc and which at the same time avoids imposing permanent coupling or connections to the piston body.

The need is therefore felt to provide a spring solution to eliminate or at least minimize the residual braking torque at the same time adapted to reduce the risk of misalignments between brake pad and braking surface of the disc facing it to promote an even wear of the friction material even in conditions of prolonged use.

SUMMARY

It is an object of the present invention to solve the drawbacks of the prior art and to provide a solution to the needs described hereto with reference to the prior art.

These and other objects are achieved by an assembly and a brake caliper as described and claimed herein.

Some advantageous embodiments are the object of the dependent claims.

FIGURES

Further features and advantages of the caliper body will be apparent from the description provided below of preferred embodiments thereof, given for illustrative but not limiting purposes, with reference to the accompanying drawings, in which.

DESCRIPTION OF SOME PREFERRED EMBODIMENTS

Figure 1:
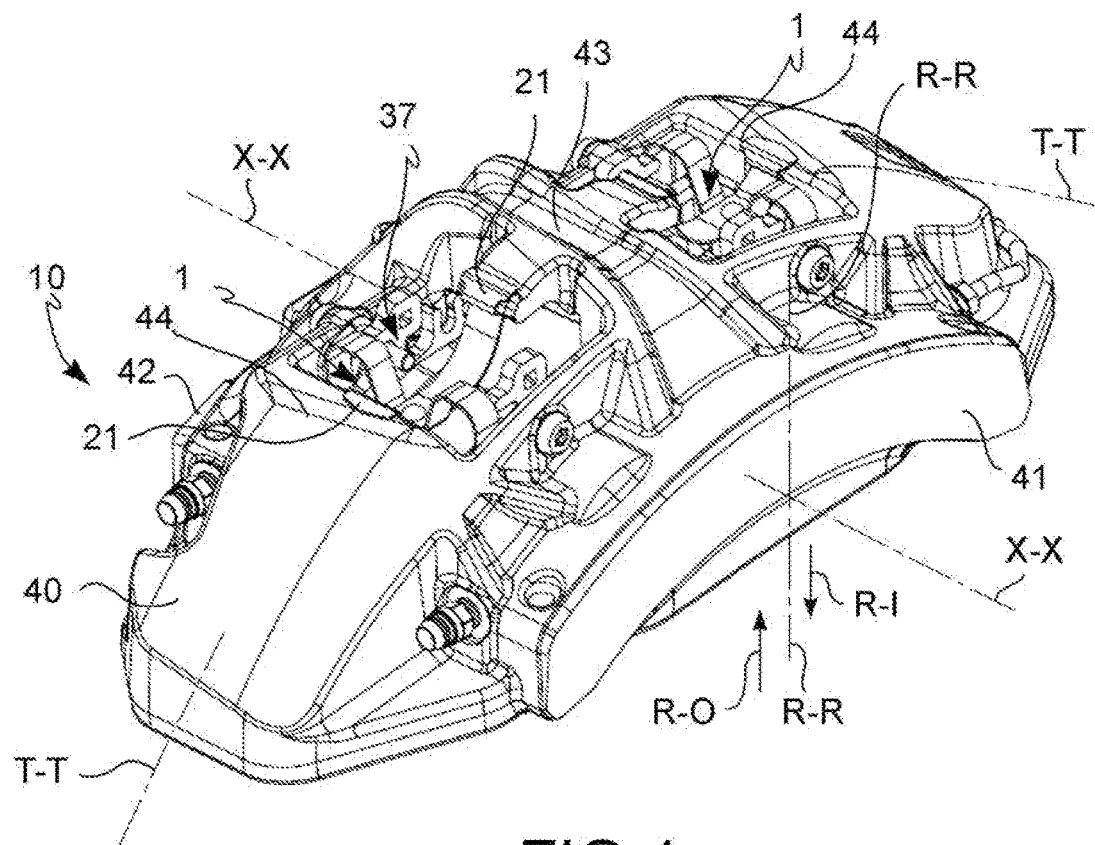
FIG. 1 is a radially outer axonometric view of a brake caliper, according to an embodiment.
Figure 2:
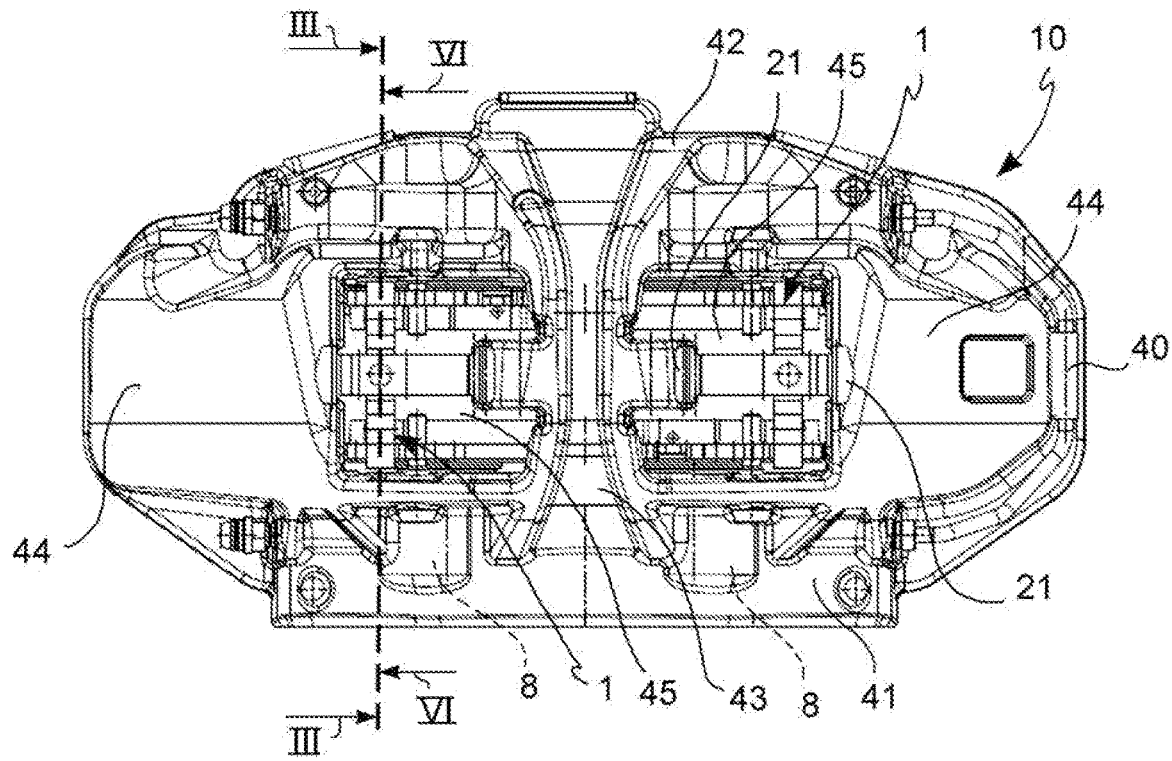
FIG. 2 is a radially outer plan view of the brake caliper in FIG. 1.
Figure 3:
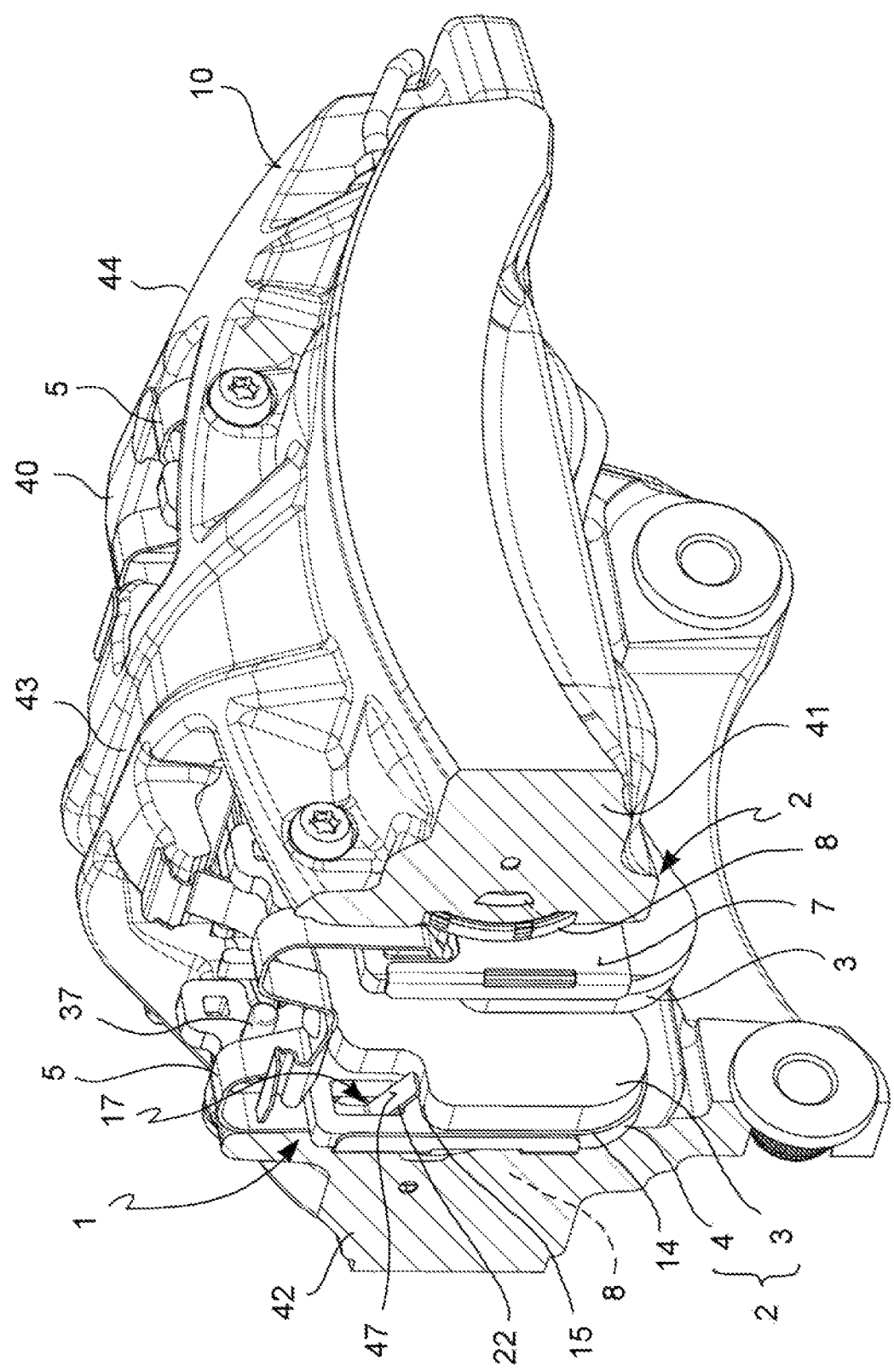
FIG. 3 is an axonometric section view of the brake caliper in FIGS. 1 and 2, in which the plotting plane is indicated by arrows III-III in FIG. 2.
Figure 4:
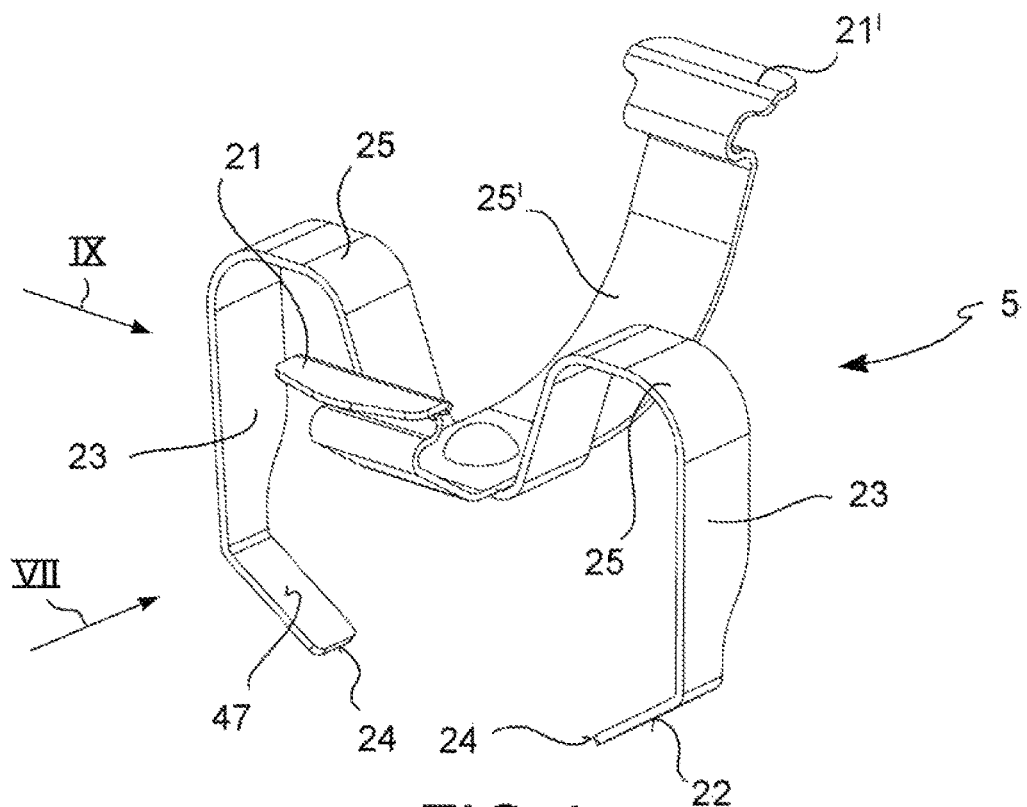
FIG. 4 is a radially outer axonometric view of an elastic device, according to an embodiment.
Figure 5:
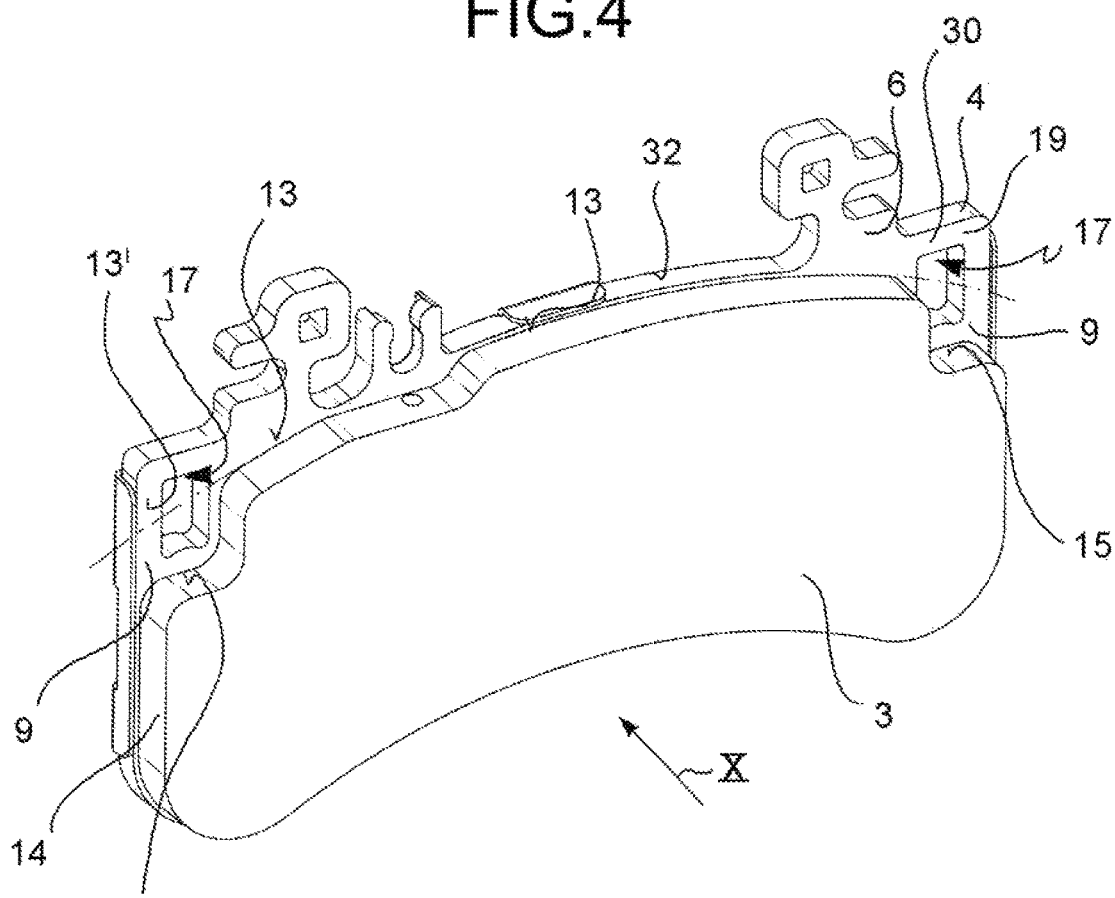
FIG. 5 is an axonometric view of a brake pad, according to an embodiment.
Figure 6:
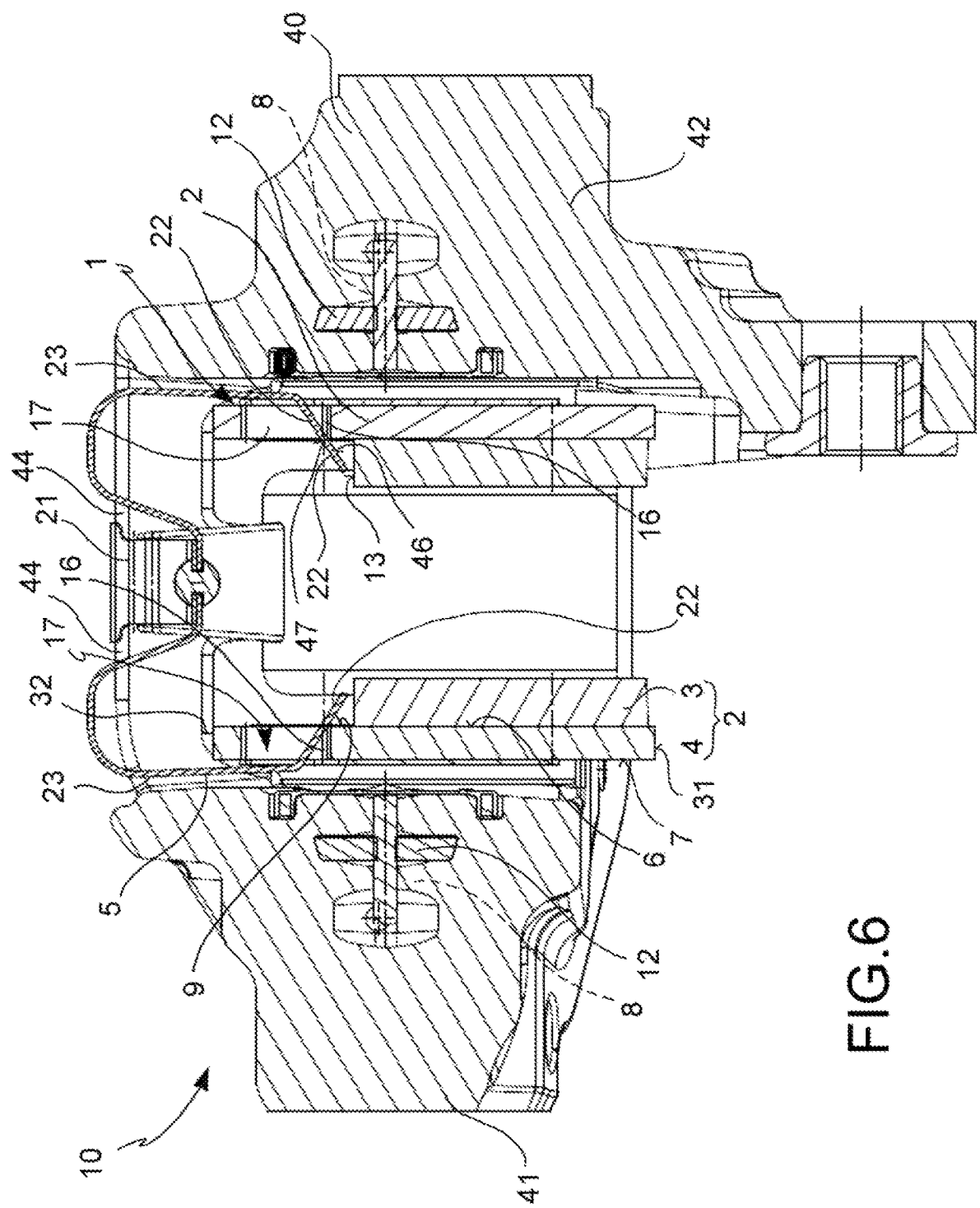
FIG. 6 is a section of the brake caliper shown in FIGS. 1 and 2, in which the plotting plane is indicated by arrows VI-VI in FIG. 2.
Figure 7:
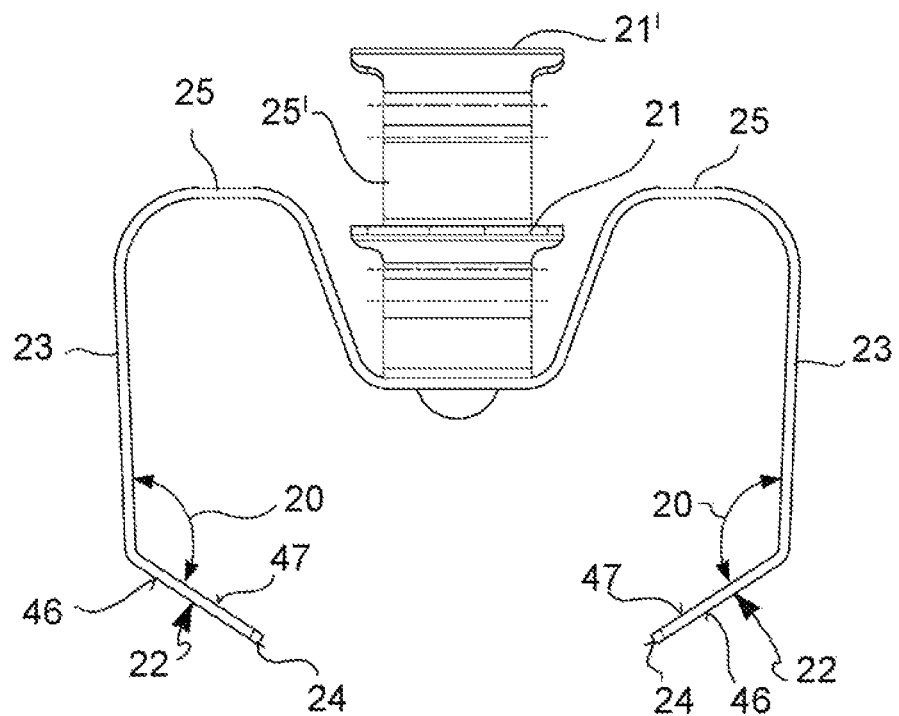
FIG. 7 is a vertical elevation view of the elastic device in FIG. 4 taken from the point of view indicated by arrow VII in FIG. 4.
Figure 8:
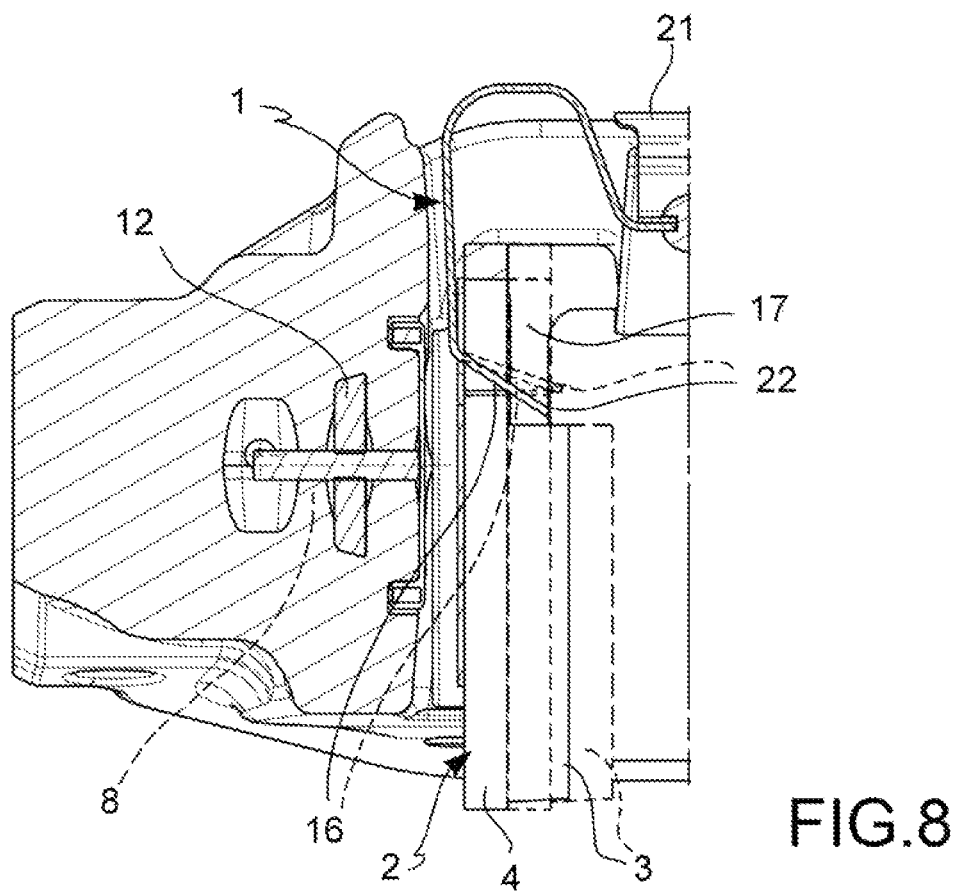
FIG. 8 is an enlargement of the section in FIG. 6 in which the pad-and-spring assembly is shown by a dotted line during the braking action.
Figure 9:
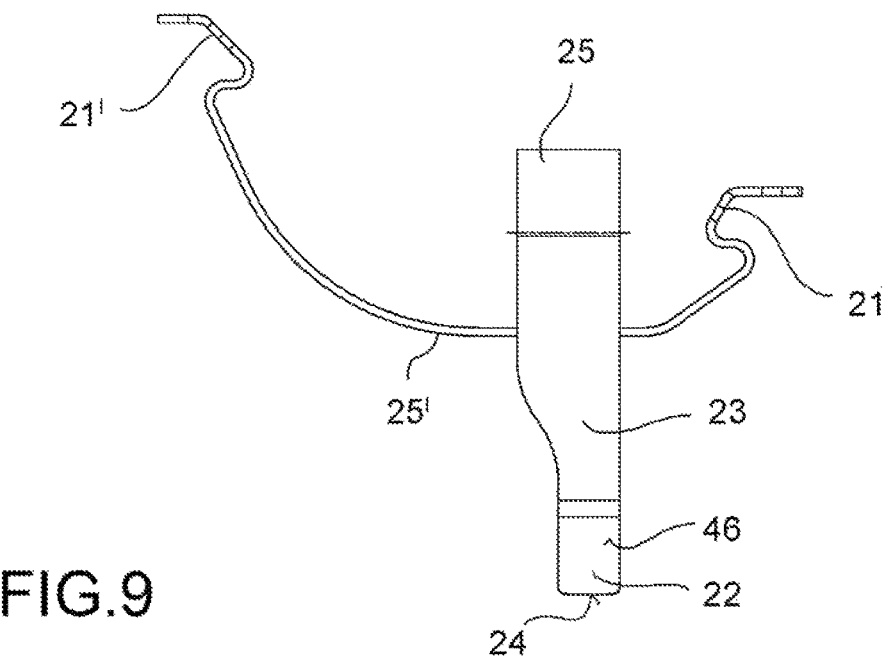
FIG. 9 is a vertical elevation view of the elastic device in FIG. 4 taken from the point of view indicated by arrow IX in FIG. 4.

According to a general embodiment, a pad-and-spring assembly 1 or assembly 1 for a brake caliper 10 for disc brake is provided.

Said assembly 1 comprises at least one brake pad 2 and at least one elastic device 5.

In a disc brake, an axial direction X-X is defined either coinciding with or parallel to the rotation axis of the disc (not shown) of said disc brake, a radial direction R-R orthogonal to the axial direction X-X, and a tangential direction T-T, orthogonal to both the axial direction X-X and to the radial direction R-R. Preferably, the radial direction R-R is incident to the rotation axis of the brake disc.

Said radial direction R-R defines a radially inward direction RI, directed towards the rotation axis of the brake disc, and a radially outward direction RO, opposite to the radially inward direction RI.

The axial X-X, radial R-R and tangential T-T directions, as well as said radially inward direction RI and said radially outward direction RE, are also defined on a brake pad 2 when it is considered not associated with the brake caliper 10, and when said brake pad 2 is considered associated with at least one elastic device 5.

Said at least one brake pad 2 comprises friction material 3, adapted to press against an exposed braking surface of the disc brake disc to apply the braking action, and a supporting plate 4 which supports said friction material 3.

Said at least one elastic device 5 is adapted to apply an elastic biasing action directed in axial direction X-X to said brake pad 2 to move it away from the brake disc when the braking action ceases. In this manner, it is possible to minimize the occurrence of undesired residual braking torque.

Said supporting plate 4 comprises a surface facing the disc 6, intimately associated with said friction material 3, and a plate back 7, axially opposite to said surface facing the disc 6 and adapted to face, either directly or indirectly, thrust means 8 of the brake caliper 10 which can be associated with said assembly 1. Preferably, said surface facing the disc 6 is partially covered with at least one layer of friction material 3.

Preferably, said thrust means 8 of the brake caliper 10 comprise at least one piston 8 of at least one cylinder-piston assembly. Preferably, the at least one cylinder of said at least one cylinder-piston assembly associated with said piston 8 is formed entirely in the caliper body 40 of the brake caliper 10. Said at least one piston 8 may be actuated hydraulically and/or electromechanically.

Said friction material 3 comprises a radially inner edge, adapted to face the rotation axis of the brake disc, and a radially outer edge 13, radially opposite to said radially inner edge.

Said radially outer edge 13 of the friction material 3 defines the at least one outer radial dimension level of the friction material 3 with its tangential extension 13' on a plane which contains said surface facing the disc 6 of the supporting plate 4. In other words, said surface facing the disc 6 of the supporting plate 4 defines a lying plane which contains it, although said supporting plate 4 has discontinuities, such as through holes and/or through slots. In other words, the outer radial dimension level of the friction material 3 is meant defined on a plane coincident with and parallel to the surface facing the disc 6 of the plate, even though the surface facing the disc 6 has discontinuities, such as through openings 17.

According to an embodiment, said outer radial dimension level of the friction material 3 is defined by drawing at least one tangential extension 13' parallel to the tangential direction T-T from the radially outer edge 13 of the friction material 3 evaluated in its length which is furthest from the rotation axis of the brake disc which can be associated with said assembly 1. In other words, the outer radial dimension level of the friction material is given by the radially outermost portion of friction material 3.

According to a preferred embodiment, said disc facing surface 6 of the supporting plate 4 comprises at least one free portion 9 or free surface 9, which is free from the contact with the friction material 3 and adapted to face a braking surface of the brake disc which can be associated with said assembly 1, said free portion 9 is located radially inside with respect to said at least one tangential extension 13' of the radially outer edge 13 of the friction material 3. In other words, said at least one free portion 9 of the surface facing the disc 6 of the supporting plate 4 of the brake pad 2 is delimited in the radially outward direction RO by said radially outer edge 13 and/or at least one of its tangential extensions 13', and preferably by the tangential extension 13' of said radially outer edge. In other words, said friction material 3 has at least one recess, so as to face said at least one free portion 9 of the disc facing surface 6 of the supporting plate 4, said friction material recess defining on said friction material 3 at least one recess edge surface 15 facing in radially outward direction RO and located at an innermost radial height than said tangential extension 13' of the radially outer edge of the friction material 3.

Advantageously, said free surface 9 of the surface facing the disc 6 of the supporting plate 4 of brake pad 2 comprises at least one through opening edge 16 which at least partially delimits a through opening 17 in axial direction X-X through said supporting plate 4 of brake pad 2. In this manner, said brake pad 2 comprises at least one through opening 17 which axially connects said plate back 7 with said free surface 9. Preferably, said through opening 17 is through across said brake pad 2. Preferably, said through opening 17 opens at said friction material recess 3.

According to a preferred embodiment, said free surface 9 of the supporting plate 4 comprises an opening margin surface, which at least partially surrounds said through opening edge 16, and preferably surrounds said through opening edge 16 in radially inner manner, i.e. in the radially inward direction RI. In this manner, the supporting portion 22 is prevented from interfering with the friction material 3 under operating conditions, e.g. during braking.

Figure 10:
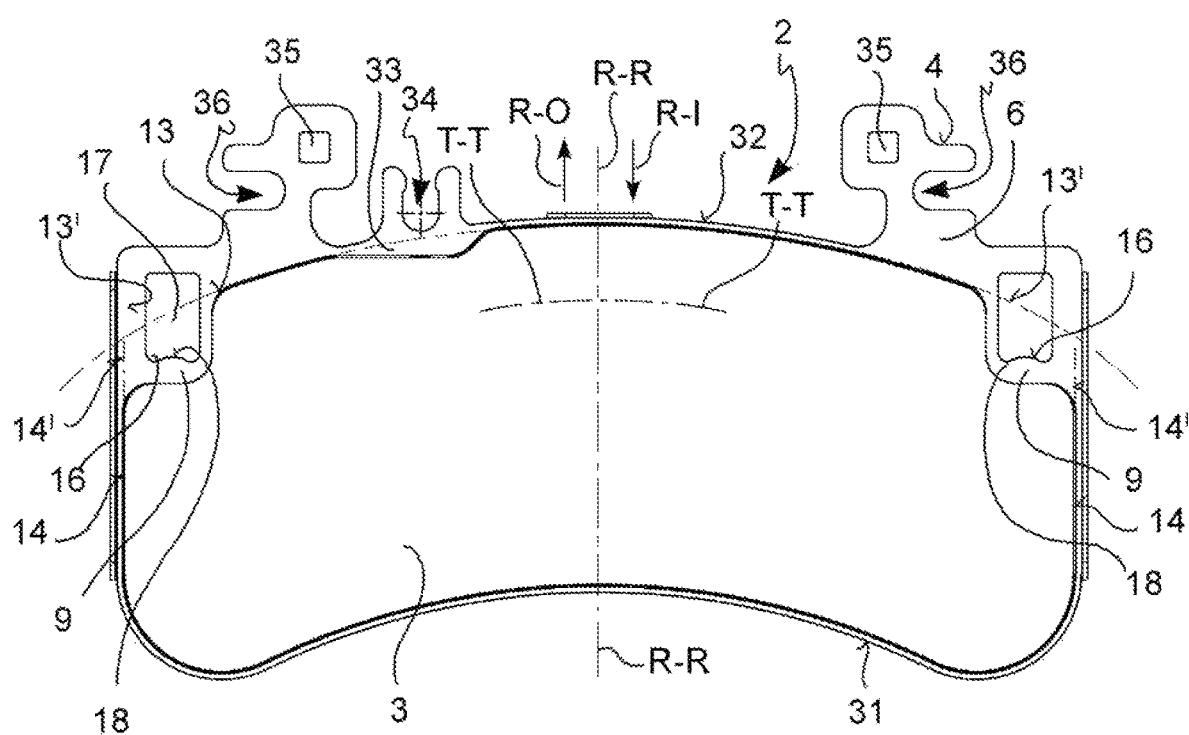
FIG. 10 is a vertical elevation view of the brake pad in FIG. 5 taken from the point of view indicated by arrow X in FIG. 5.
Figure 11:
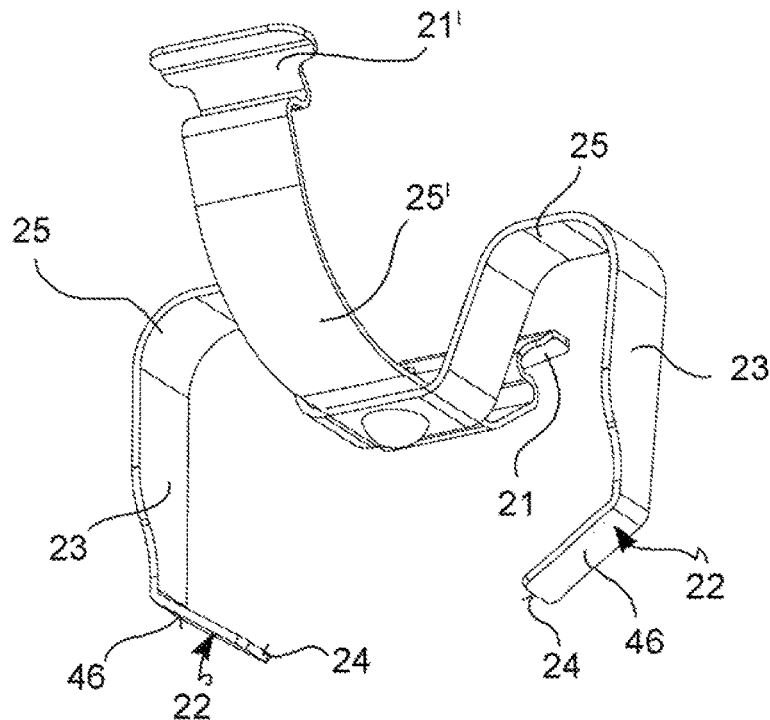
FIG. 11 is an inner radial axonometric view of the elastic device in FIG. 4.
Figure 12:
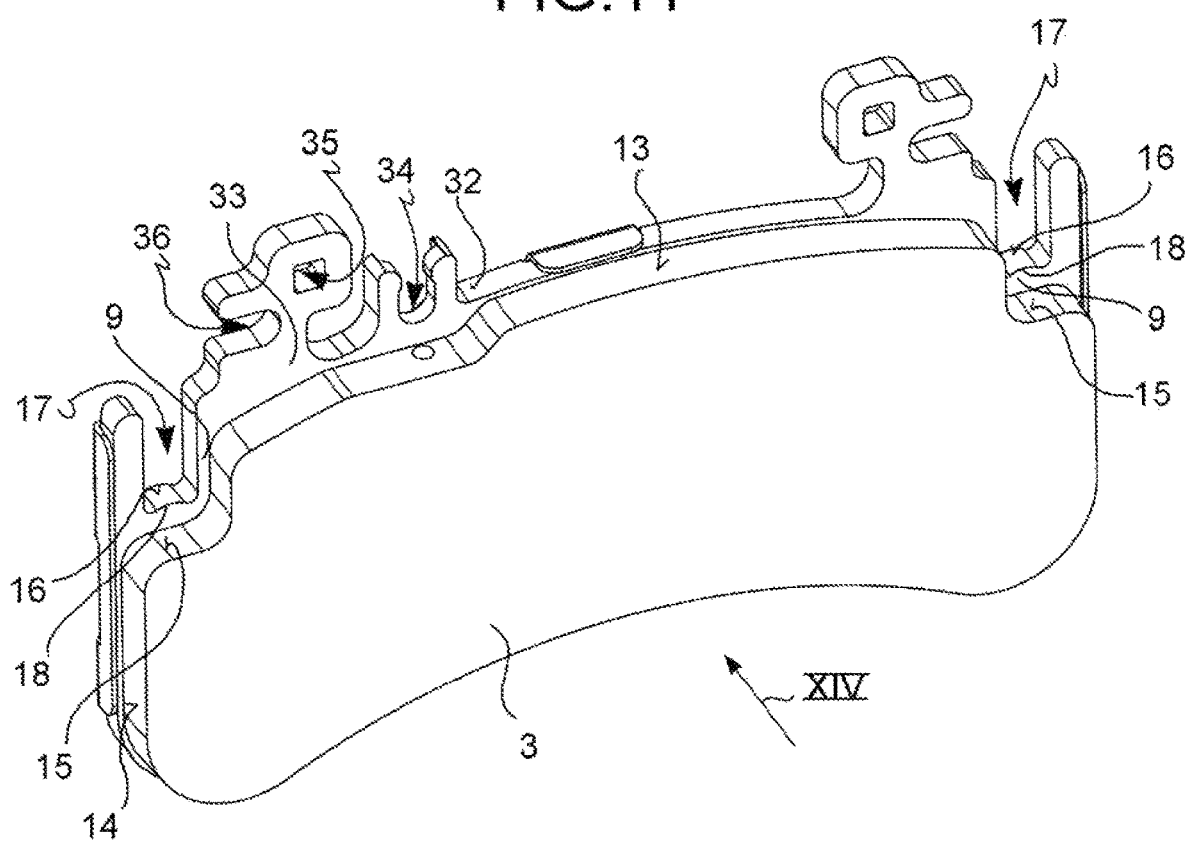
FIG. 12 is an axonometric view of a brake pad, according to an embodiment.

According to an embodiment, as shown for example in FIG. 10, said through hole 17 is a through hole surrounded by a closed periphery.

Preferably, said closed periphery of the through opening 17 is partially described on said free surface 9. In other words, the closed periphery of the through opening 17 crosses the tangential extension 13' of the radially outer edge 13 of the friction material 3.

Figure 13:
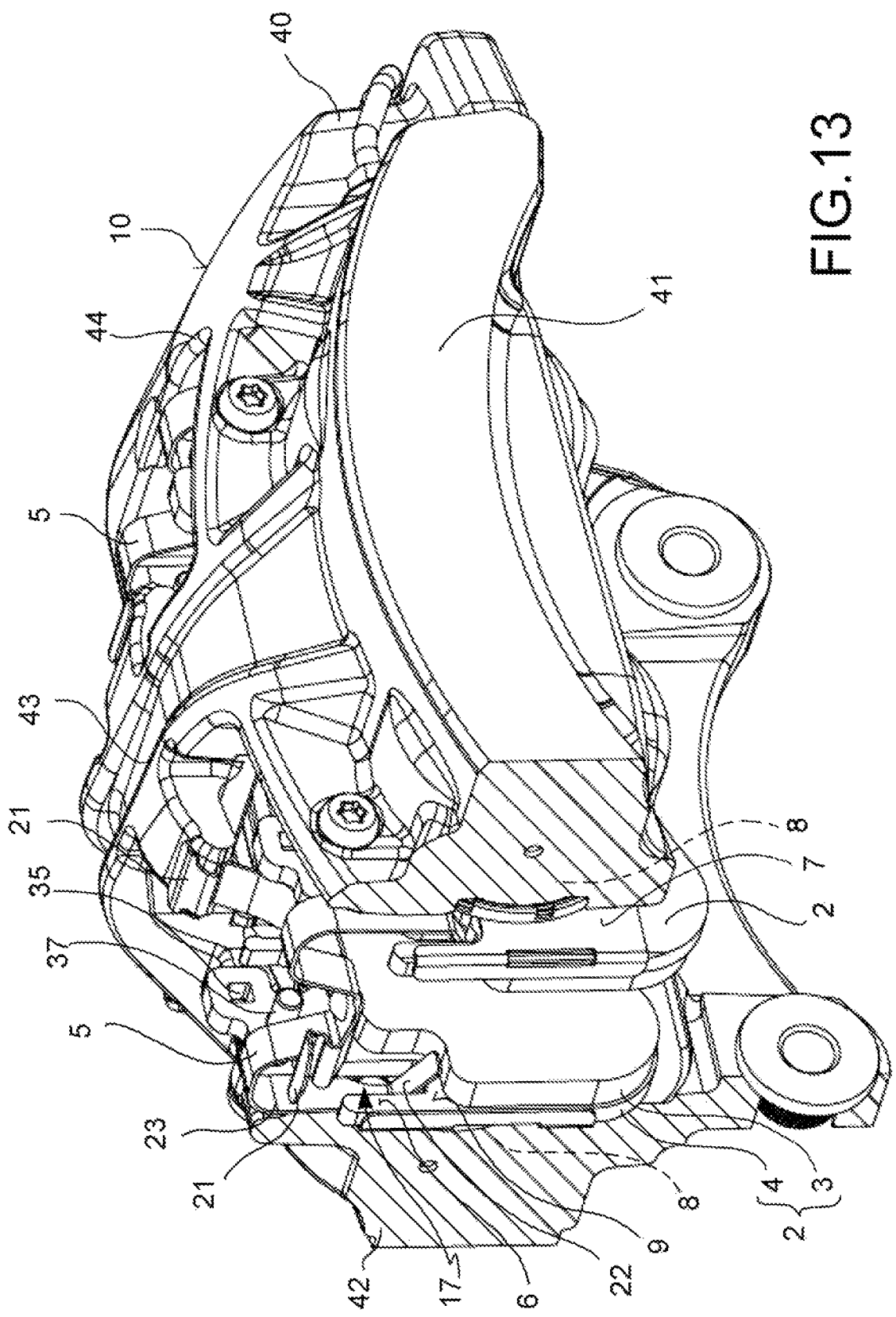
FIG. 13 is an axonometric section view of the brake caliper body of FIGS. 1 and 2 taken along the plotting plane indicated by arrows III-III in FIG. 2, in which an elastic device associated with the brake pad shown in FIG. 12 is shown.
Figure 14:
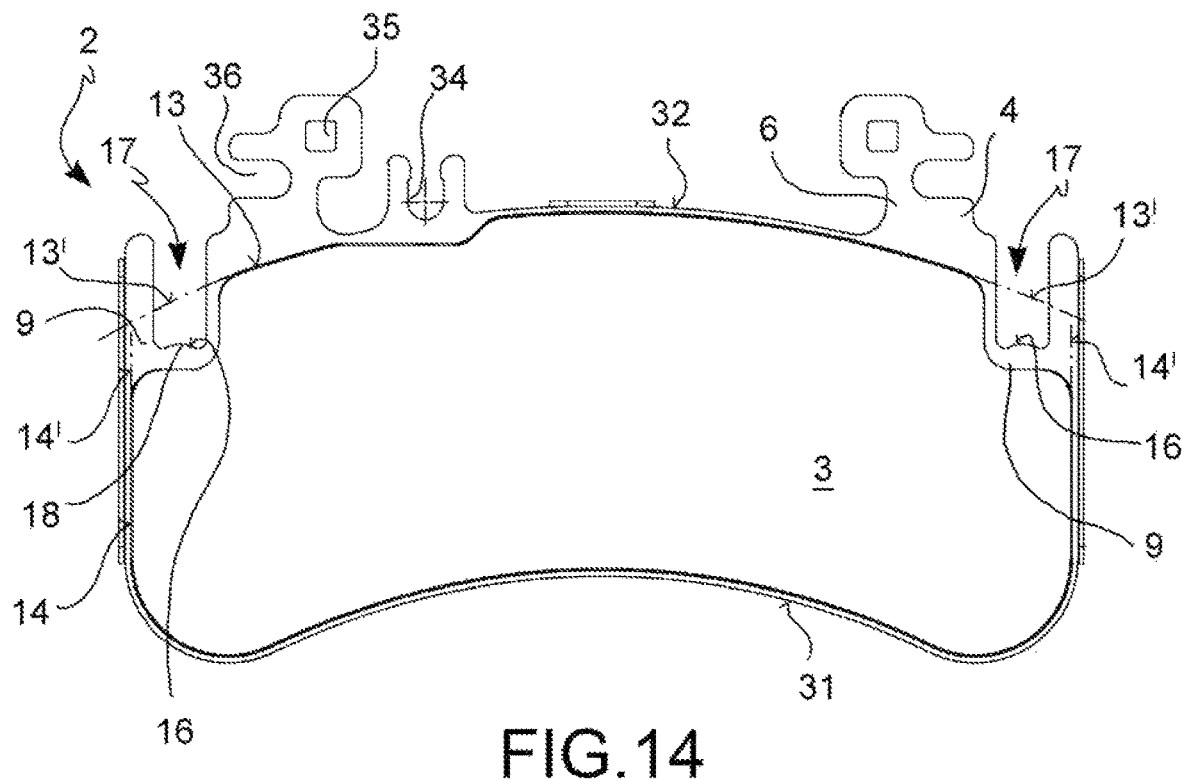
FIG. 14 is a vertical elevation view of the brake pad in FIG. 12 taken from the point of view indicated by arrow XIV in FIG. 12.
Figure 15:
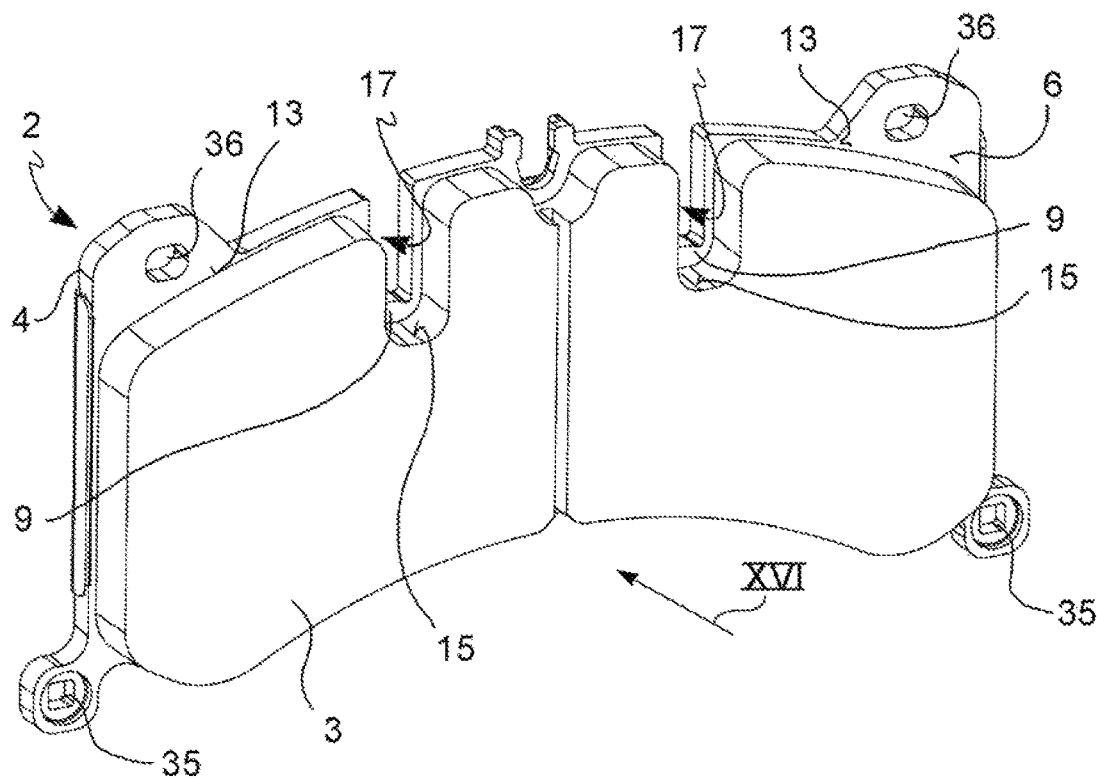
FIG. 15 is an axonometric view of a brake pad, according to an embodiment.
Figure 16:
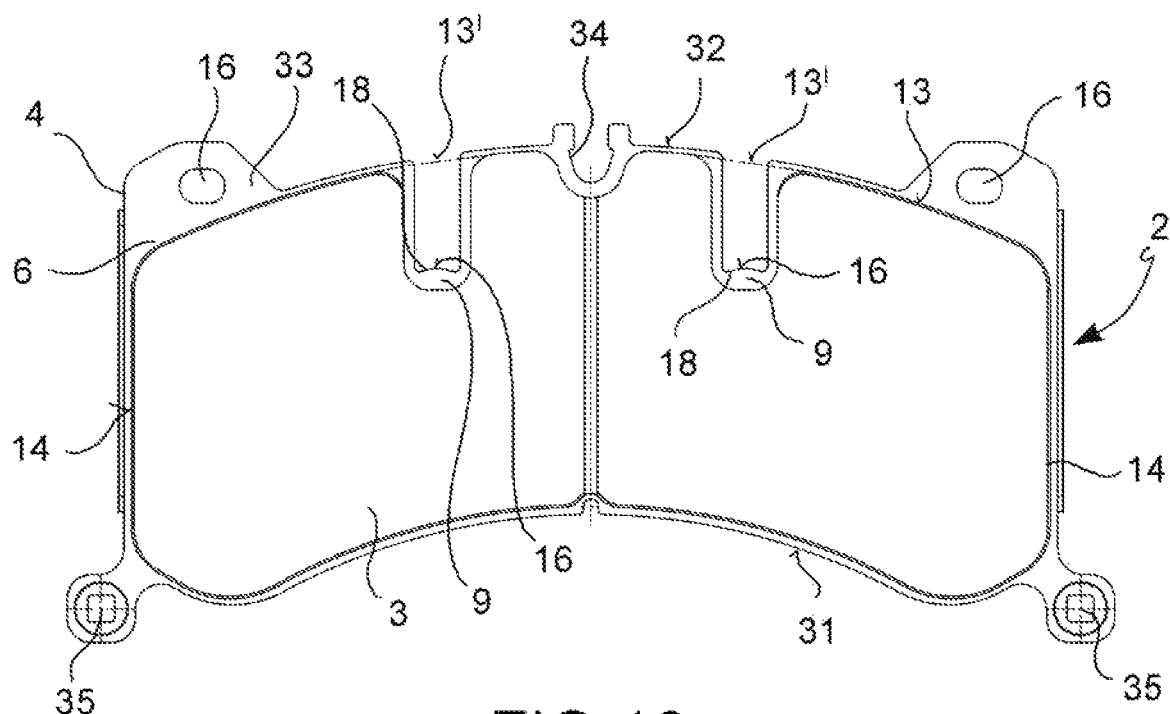
FIG. 16 is a vertical elevation view of the brake pad in FIG. 15 taken from the point of view indicated by arrow XVI in FIG. 15.
Figure 17:
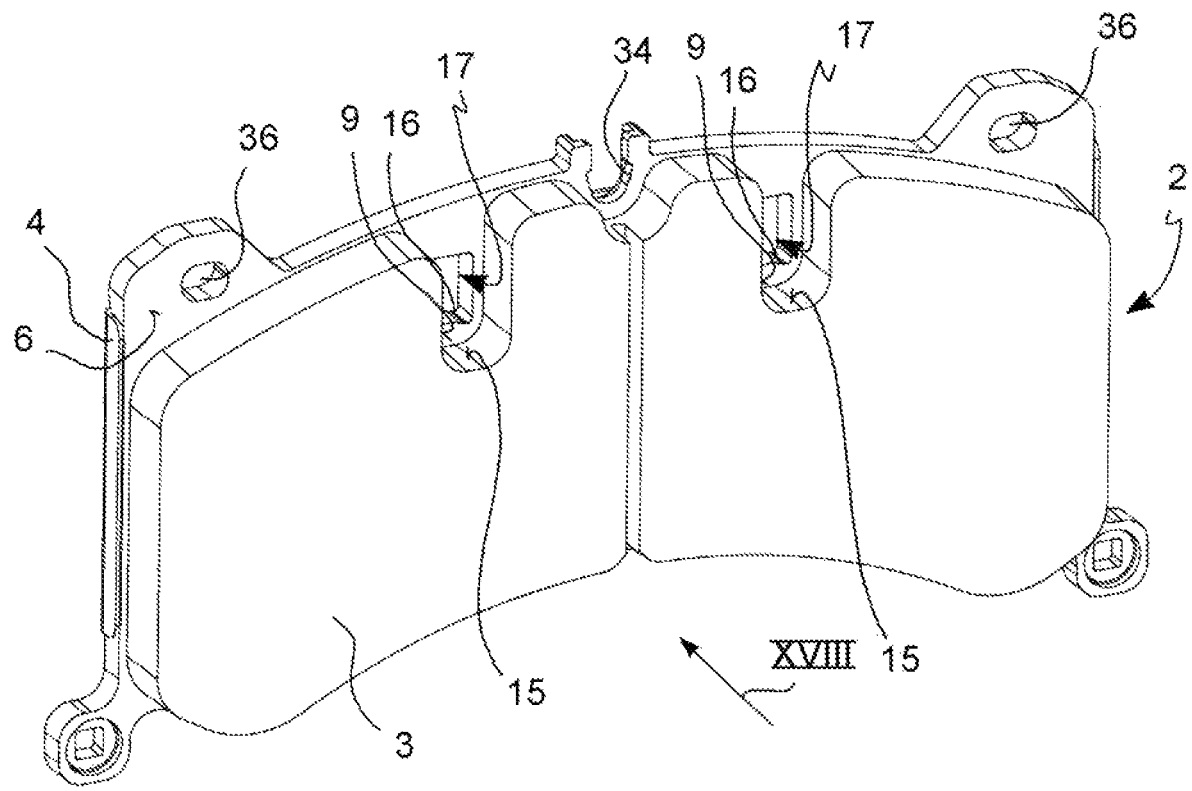
FIG. 17 is an axonometric view of a brake pad, according to an embodiment.
Figure 18:
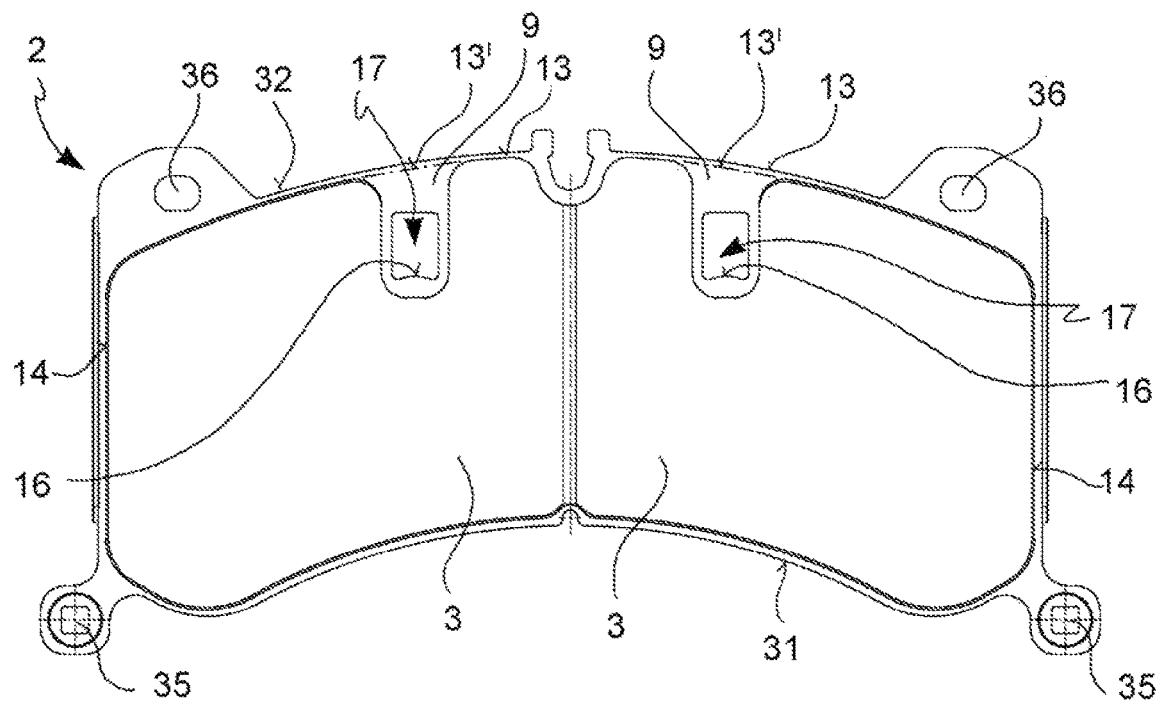
FIG. 18 is a vertical elevation view of the brake pad in FIG. 17 taken from the point of view indicated by arrow XVIII in FIG. 17.

According to an embodiment, as shown for example in FIG. 13, said through opening 17 is a through slot surrounded by an open periphery, and preferably said open periphery of the through opening 17 leads to a radially outward direction RO.

With further advantage, said at least one elastic device 5 has a body comprising at least one connecting portion 21, 21', adapted to connect to the body of the brake caliper 10 which can be associated with said assembly 1, and at least one supporting portion 22, which rests against said opening edge 16 of the free surface 9 of the supporting plate 4 axially crossing said passing opening 17 of the supporting plate 4. In other words, said at least one supporting portion 22 extends at least in axial direction X-X, and preferably also in radial direction R-R, through said through opening 17 to abut against said through opening edge 16 described on the free portion 9 of the surface facing the disc 6 of the supporting plate 4 of the brake pad 2.

In this manner, it is possible to apply an elastic biasing action on said brake pad 2 in axial direction X-X to move the brake pad 2 away from an associable brake disc.

When, under operating conditions, during the braking action, said brake pad 2 is pushed by thrust means 8 to abut against an approachable braking surface of a brake disc, concurrently applying an axial thrust action against the support portion 22 of the elastic device 5, which deforms itself by charging elastically. Preferably, during the braking action the through opening edge 16 slides on said supporting portion 22 of the elastic device 5, thereby deforming it elastically in the radially outward direction RO while remaining in contact therewith. When the braking control ceases, the spring supporting portion 22 applies said elastic biasing action to move the brake pad 2 away from the disc.

Preferably, said through opening edge 16 is facing in radially outward direction RO. Preferably, said through opening edge 16 delimits said through opening 17 in radially inward direction RI.

Preferably, said at least one elastic device 5 has a body further comprising at least one arm 23 which extends, preferably in radial direction R-R, between said supporting portion 22 and said connecting portion 21, 21' of the body of the elastic device 5.

In this manner, it is possible to apply a direct elastic biasing action in axial direction X-X between said caliper body 40 of the brake caliper 10 and said brake pad 2 aimed at moving the brake pad 2 away from an associable brake disc.

Not necessarily, said at least one arm 23 directly connects said supporting portion 22 to said connecting portion 21, 21', if it can do so, but still allows said elastic device 5 to apply a direct elastic biasing action at least in axial direction X-X between the body of the brake caliper 10 and the brake pad 2.

According to an embodiment, said at least one arm 23 extends for at least one portion thereof either facing and/or in contact with said plate back 7 of the supporting plate 6 of the brake pad 2.

According to an embodiment, said at least one arm 23 extends radially outwards with respect to said tangential extension 13' of the radially outer edge 13 of the friction material 3. According to an embodiment, the body of said elastic device 5 comprises at least one further connecting portion 25, 25', e.g. an arm, which connects said connecting portion 21, 21' to said at least one arm 23, thereby forming a preferably arch-shaped path, so as to take said connecting portion 21, 21' to an axial level comprised between the radial extensions of the braking surfaces of the brake disc associated with said assembly 1. According to an embodiment, said elastic device 5 comprises a cross-shaped body, and at least two axially opposite arms 23, each ending with at least one supporting portion 22, so as to bias two opposite brake pads 2 in the axial direction X-X away from the brake disc. In this manner, said assembly 1 further comprises at least one further opposite brake pad 2 so as to comprise two opposite brake pads 2, adapted to press against opposite braking surfaces of a brake disc which can be associated with said assembly 1.

According to an embodiment, said assembly 1 comprises a further separate elastic device 5, so as to comprise two elastic devices 5 arranged tangentially side-by-side both acting with their resting portions 22 on the same brake pad 2 and/or on the same pair of opposite brake pads 2.

According to an embodiment, said at least one arm 23 extends in radially outward direction RO from said supporting portion 22 of the elastic device 5 between said plate back 7 and the body of the brake caliper 10 which can be associated with said assembly 1.

According to a preferred embodiment, said through opening edge 16 comprises an arch-shaped resting length 18, so as to allow the resting portion 22 of the elastic device 5 to rest in a minimum contact area, ideally coinciding with a single point of contact between elastic device 5 and through opening edge 16. In this manner, it is possible to apply a ready axial elastic bias on the brake pad.

Figure 23:
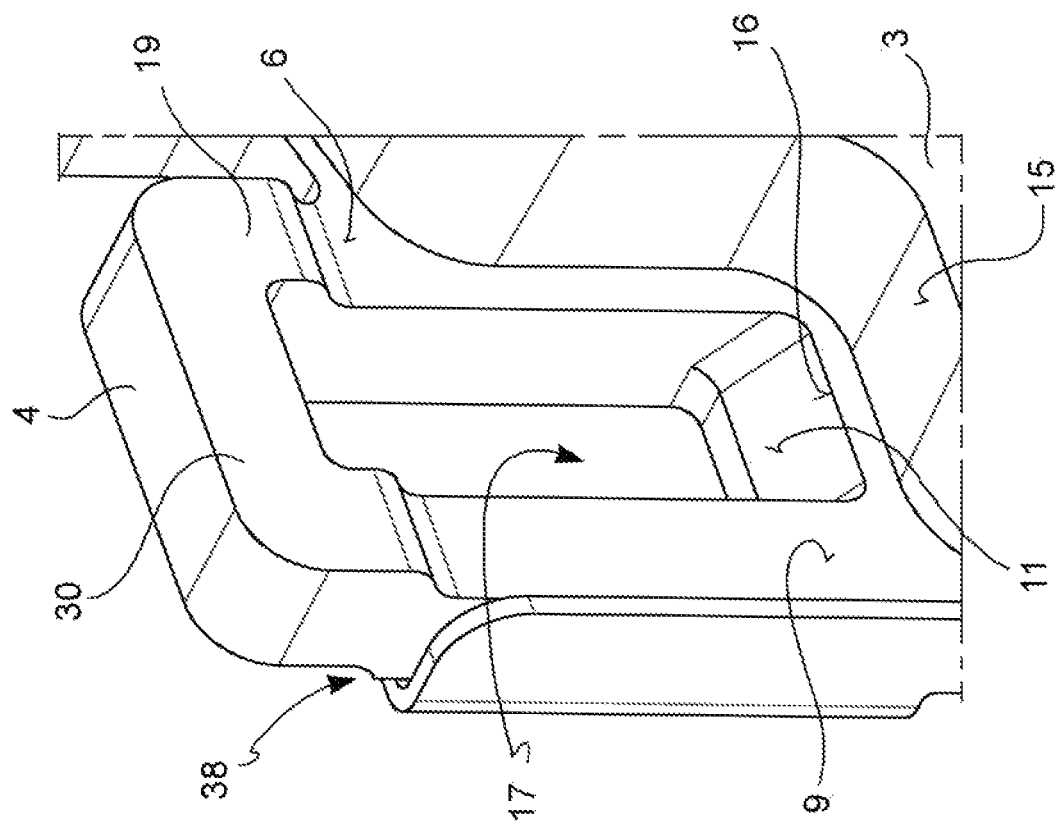
FIG. 23 is an axonometric view of a detail in FIG. 20.
Figure 22:
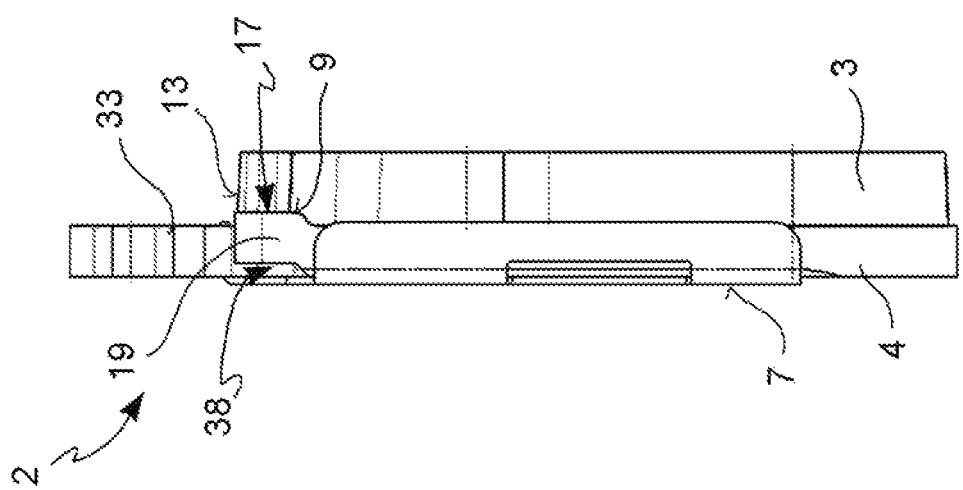
FIG. 22 is a vertical elevation view of the brake pad in FIGS. 20 and 21 taken from the point of view indicated by arrow XXII in FIG. 21.

According to an embodiment, as shown for example in FIG. 23, said through opening edge 16 is associated with a slide 11 which extends between said plate back 7 and said free surface 9 of the supporting plate 4. Preferably, said slide 11 is inclined with respect to the axial direction X-X by a predefined inclination angle. According to a preferred embodiment, said slide 11 is inclined towards the rotation axis of the brake disc which can be associated with said assembly 1. According to a preferred embodiment, said slide 11 is inclined in the radially inward direction RI towards said opening edge 16, in other words, it is inclined in the radially inward direction RI moving along the axial direction X-X from said plate back 7 to said free surface 9 of the surface facing the disc 6 of the supporting plate 4. Preferably, said predetermined inclination angle is substantially equal to said angle 20 formed between said supporting portion 22 and said arm 23 of the elastic device 5.

According to an embodiment, said through opening 17 is surrounded by an eyelet 19 having a radially outward eyelet side 30.

According to an embodiment, said eyelet 19 being axially offset with respect to the plate back 7 is preferably axially offset towards the brake disc which can be associated with said assembly 1, thus forming a resting portion seat 38 adapted to receive a portion of said support portion 22 of the elastic device 5.

According to an embodiment, said supporting portion 22 comprises a radially inner surface 46 which goes into abutment onto said through opening edge 16, and an opposite radially outer surface 47. Preferably, said radially outer surface 47 goes into abutment against said radially outer edge 30 of said eyelet 19.

According to a preferred embodiment, said at least one arm 23 of the elastic device 5 ends with a free end 24 defining said supporting portion 22. According to a preferred embodiment, said free end 24 defining said supporting portion 22 at least axially protrudes from said arm 23. In this manner, it is possible for said supporting portion 22 to go into abutment against said through opening edge 16 placed radially internally with respect to said tangential extension 13' of the radially inner edge 13 of the friction material 3 without because of this interfering with the footprint of the pistons on the plate back 7 of the brake pad 2.

The term "footprint of the piston" means one or more areas in which, during the braking action, the piston 8 acts, either directly or indirectly, on the plate back 7 of the supporting plate of brake pad 2. In other words, at least one footprint of piston 8 is defined axially at the area of brake pad 2 on which the thrust means 8 act during the braking action.

Figure 19:
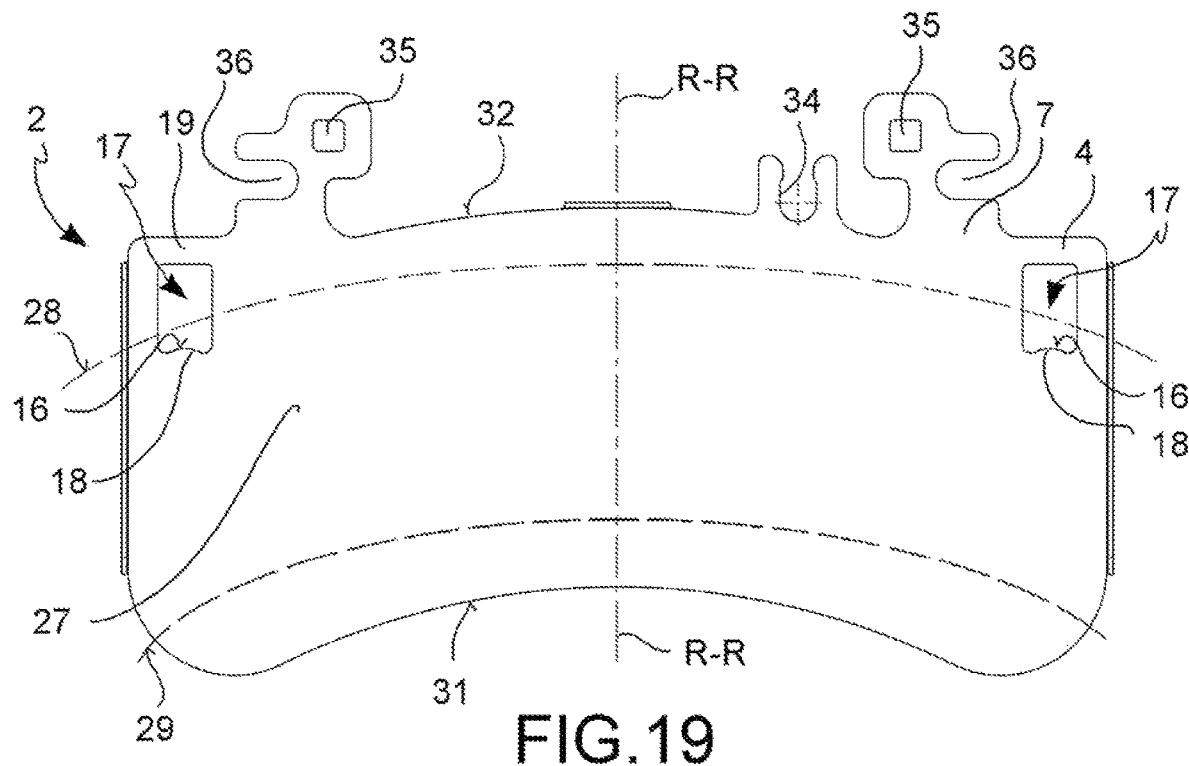
FIG. 19 is a vertical elevation view of the back of the brake pad shown in FIG. 10.
Figure 20:
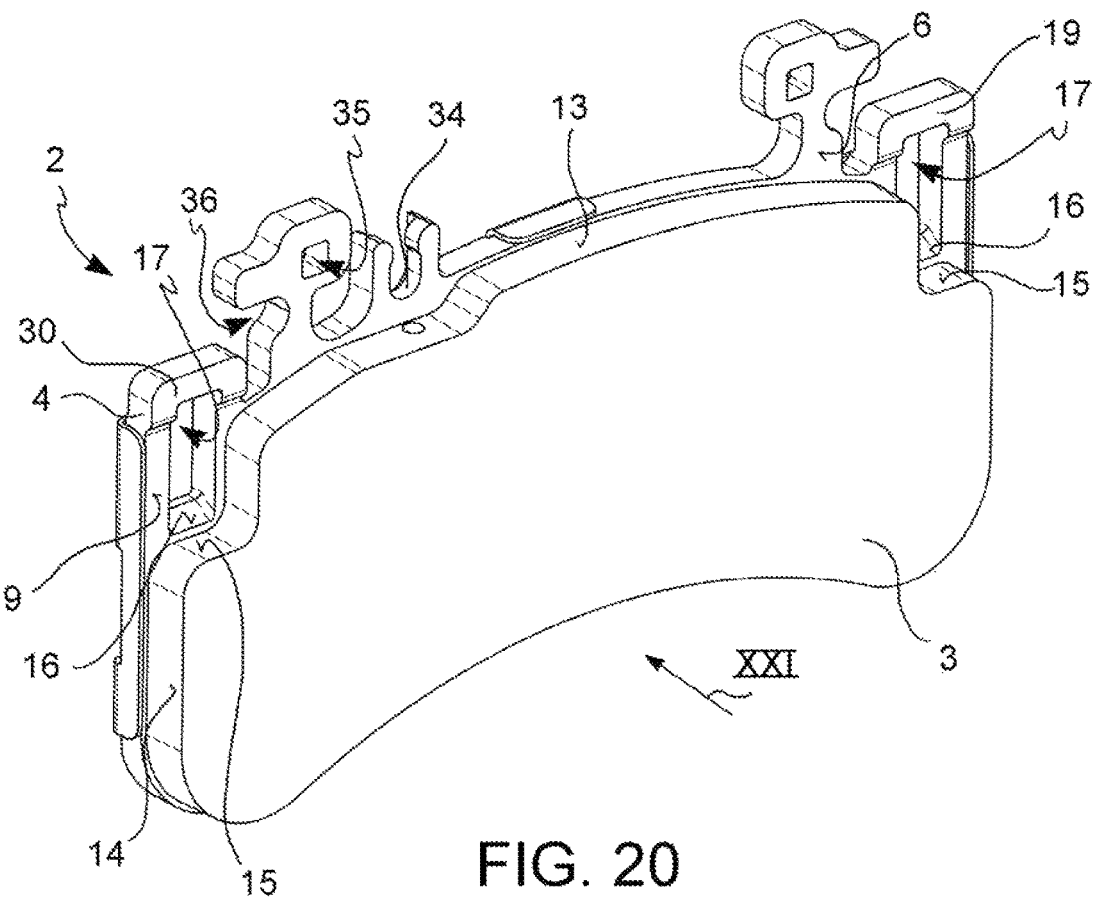
FIG. 20 is an axonometric view of a brake pad, according to an embodiment.
Figure 21:
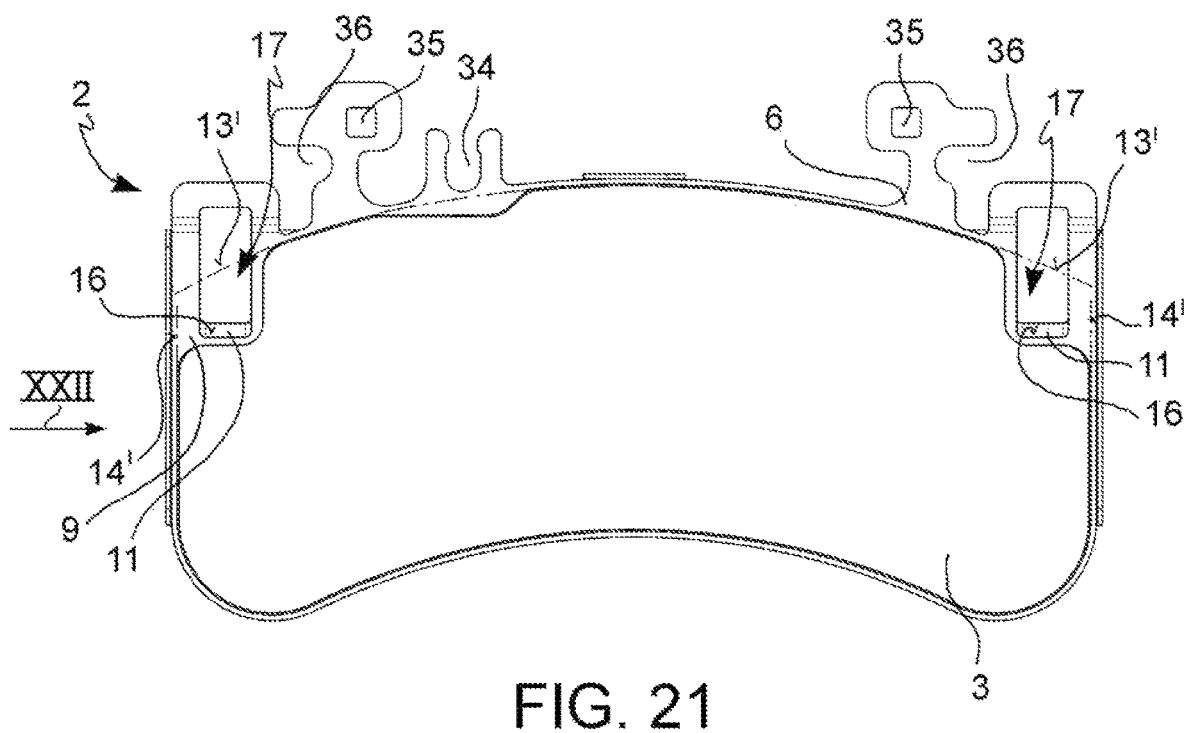
FIG. 21 is a vertical elevation view of the brake pad in FIG. 20 taken from the point of view indicated by arrow XXI in FIG. 20.

As shown, for example in FIG. 19, preferably a radial dimension piston band 27 defined by the radial dimension of the piston footprint is defined on said plate back 7 of the supporting plate 4 of the brake pad 2. According to an embodiment, said piston footprint defines an outer radial piston level 28 substantially coinciding with the extension parallel to the tangential direction T-T on the plate back 7 of the radial height of the piston footprint evaluated in the farthest point thereof from the rotation axis of the disc. According to an embodiment, said piston footprint defines an inner radial piston level 29 substantially coinciding with the extension parallel to the tangential direction T-T on the plate back 7 of the radial height of the piston footprint evaluated in the closest point thereof to the rotation axis of the disc. According to an embodiment, said radial dimension piston band 27 is delimited in radial direction R-R by said outer radial piston level 28 and said inner radial piston level 29.

Said radial dimension piston band 27, said outer radial piston level 28 and said inner radial piston level 29 are also defined on said surface facing the disc 6 of the supporting plate 4, by means of their axial extension through the supporting plate 4.

Preferably, said through opening edge 16 of the free surface 9 of the supporting plate 4 of the brake pad 2 on which said supporting portion 22 of the elastic element 5 rests is radially inside said outer radial piston level 28, and preferably is comprised in said radial dimension piston band 27.

According to an embodiment, said free end 24 protrudes in axial direction X-X from said arm 23, thus forming an angle 20 with said arm 23. According to a preferred embodiment, said angle 20 is greater than 90°. Preferably, said angle 20 is comprised between 120° and 180°, preferably said angle 20 is substantially equal to 135°.

According to a preferred embodiment, said at least one arm 23 of the elastic device 5 is made in the form of a leaf, preferably made of spring steel.

Preferably, said arm 23 and said supporting portion 22 are made in a single piece.

According to a preferred embodiment, said at least one connection portion 21, 21' of elastic device 5 is adapted to be coupled to a portion of the brake caliper body 2 which can be associated with said assembly 1, and preferably at least one brake caliper bridge of said brake caliper body 10.

According to an embodiment, said supporting plate 4 of the brake pad 2 comprises a plate radially inner edge 31, adapted to face the rotation axis of an associated disc brake disc, and an opposite plate radially outer edge 32, opposite to said plate radially inner edge 31. Preferably, said radially outer plate edge 32 which defines a radially outer plate edge portion 33 on said surface facing the disc 6 of the supporting plate 4, radially between the radially outer plate edge 13 of the friction material 3 and the radially outer plate edge 32. According to an embodiment, said plate radially outer edge 32 delimits at least one wear sensor seat 34 adapted to receive at least one portion of a friction material wear signaling device. According to an embodiment, said plate radially outer edge 33 delimits at least one damper seat 35, adapted to receive at least one portion of a device for adjusting the vibration frequency of the brake pad, such as for example, an additional mass.

According to an embodiment, said portion of plate radially outer edge 33 delimits at least one pin seat 36 adapted to receive at least one sliding pin 37 of said brake caliper 10 adapted to guide the movement of brake pad 2 with respect to the brake caliper body 10 both during the braking action and when the braking action ceases. Preferably, said at least one sliding pin 37 also acts as a radial constraint to a radial elastic biasing action applied by said elastic device 5. According to an embodiment, said supporting portion 22 of the elastic device applies on said through opening edge 16 also a direct biasing action in the radially inward direction RI. Preferably, said direct biasing action in the radially inward direction RI is contrasted by virtue of the provision of said sliding pins 37 that cooperate with the walls of said pin seat 36.

According to an embodiment, said friction material 3 further comprises at least one side edge 14 facing tangential direction T-T and adapted to face the brake caliper 10 associated with said assembly 1.

According to an embodiment, said at least one side edge 14 defines the outer radial dimension level of the friction material 3 with its tangential extension 14' on said surface facing the disc 6 of the supporting plate 4. According to an embodiment, said extension 14' can also not be parallel to the radial direction R-R but parallel to a definable middle axis brake pad 2.

According to an embodiment, said free surface 9 is delimited in radially outward direction RO by said outer radial dimension level and in tangential direction T-T by said outer tangential dimension of the friction material 3 and by said friction material 3.

In accordance with an embodiment, said free surface 9 is delimited in radially outward direction RO by said outer radial dimension level and tangentially T-T by said friction material 3.

According to a general embodiment, a disc brake 10 is provided comprising a caliper body 40, adapted to be arranged straddling a brake disc which can be associated with the brake caliper 10 and at least one pad-and-spring assembly 1, according to any one of the preceding embodiments.

Preferably, said brake caliper 10 further comprises thrust means 8 adapted to press at least one brake pad 2 against the facing braking surfaces of the brake disc which can be associated with said brake caliper 10. Preferably, said thrust means comprise at least one piston 8, actuated hydraulically and/or electro-mechanically, said at least one piston 8 being associated with at least one retraction device 12, or roll-back device 12, adapted to retract by a predefined entity said piston 8 with respect to the caliper body 40 when the braking command ceases. Preferably, said retraction device 12 also acts as a knock-back device to extract, if necessary, said piston 8 from the body of the caliper 40 by a predetermined entity.

According to an embodiment, said thrust means 8 of the brake caliper 10 define said footprint of the piston and said radial dimension piston band 27.

Said caliper body 40 comprises a pair of opposing elongated portions 41, 42, each adapted to face, either directly or indirectly by means of at least one brake pad 2, one of the opposite braking surfaces of a brake disc which can be associated with said brake caliper 10.

Said caliper body 40 further comprises at least one caliper bridge 43, 44, which connects said elongated portions 41, 42 together being arranged straddling an associable disc brake.

Preferably, said at least one caliper bridge 43 or 44 are at least three caliper bridges, in which said at least three caliper bridges delimit caliper body radial openings 45 between them.

Preferably, said at least three caliper bridges comprise at least one central bridge 43 and at least one pair of side bridges 44, tangentially opposite to said central bridge 43.

According to an embodiment, said at least one connecting portion 21, 21' of at least one elastic device 5 of the assembly 1 is coupled to at least two caliper bridges 43 and 44, and preferably a central bridge 43 and a side bridge 44, being arranged inside said at least one radial caliper opening 45. Preferably, two separate elastic devices 5 are provided placed tangentially side by side, so as to couple both to the central bridge 43 and also to couple each to one of the end bridges 44.

According to a preferred embodiment, said caliper body 40 is a fixed-type caliper body having opposite thrust means 8 for brake pads housed in said opposite elongated portions 41, 42.

By virtue of the features described above, either mutually separately or jointly in particular embodiments, it is possible to obtain an assembly which at the same time satisfies the aforesaid mutually contrasting needs and the aforesaid desired advantages, and in particular:
- it is possible to bias the brake pad away from the disc in a balanced manner, thereby avoiding misalignments between the brake pad and the braking surfaces of the brake disc;
- it is possible to bias the brake pad away from the disc avoiding to place springs between the brake pad and the piston, in order to increase the heat exchange properties of the piston;
- it is possible to avoid encumbering volume of space between the pads with springs.

The person skilled in the art may make many changes and adaptations to the embodiments described above or may replace elements with others which are functionally equivalent in order to satisfy contingent needs without however departing from the scope of the appended claims.

LIST OF REFERENCES

1 Pad-and-spring assembly or assembly
2 Brake pad
3 Friction material
4 Supporting plate
5 Elastic device
6 Side facing disc of the supporting plate
7 Plate back
8 Thrust means or piston
9 Free portion or free surface
10 Brake caliper
11 Slide
12 Piston retraction or roll-back device
13 Friction material radially outer edge
13' Tangential extension of the friction material radially outer edge
14 Friction material side edge
14' Friction material side extension
15 Friction material recess surface
16 Through opening edge
17 Through opening
18 Through opening arch-shaped length
19 Eyelet
20 Angle
21, 21' Elastic device connecting portion
22 Elastic device supporting portion
23 Elastic device arm
24 Elastic device free end
25, 25' Elastic device further connecting portion
27 Radial dimension piston band
28 Outer radial piston level on supporting plate
29 Inner radial piston level on supporting plate
30 Radially outer eyelet edge
31 Radially inner plate edge
32 Radially outer plate edge
33 Radially outer plate margin
34 Wear sensor seat
35 Damper seat
36 Pin seat
37 Sliding pin
38 Supporting portion seat
40 Caliper body
41, 42 Caliper body elongated portions
43 Central caliper bridge
44 Side caliper bridge
45 Radial caliper opening
46 Supporting portion radial inner surface
47 Supporting portion radial outer surface
X-X Axial direction
R-R Radial direction
T-T Tangential direction
RO Radially outward direction
RI Radially inward direction

The invention claimed is:

1. A pad-and-spring assembly for a brake caliper for a disc brake, wherein an axial direction (X-X) either coinciding with or parallel to a rotation axis of a brake disc of said disc brake, a radial direction (R-R) orthogonal to the axial direction (X-X), and a tangential direction (T-T) orthogonal to both the axial direction (X-X) and the radial direction (R-R) are defined, wherein said radial direction (R-R) defines a radially inward direction, directed towards the rotation axis of the brake disc, and a radially outward direction, opposite to the radial inward direction; said pad-and-spring assembly comprising:
at least one brake pad comprising friction material and a supporting plate which supports said friction material;
at least one elastic device, configured to apply an elastic biasing action directed in axial direction (X-X) to said at least one brake pad to move it away from the brake disc when a braking action ceases;
wherein:
said supporting plate comprises a disc facing surface disc, intimately associated with said friction material, and a plate back, axially opposite to said disc facing surface and configured to face thrust means of the brake caliper associable with said assembly;

said friction material comprises a radially inner edge, configured to face the rotation axis of the brake disc, and a radially outer edge, radially opposite to said radially inner edge;

said radially outer edge of the friction material defines an outer radial dimension level of the friction material with its tangential extension on said disc facing surface of the supporting plate;

said disc facing surface of the supporting plate comprises at least one free surface, free from contact with the friction material and configured to face a braking surface of the brake disc associable with said pad-and-spring assembly, wherein said at least one free surface is located radially inside with respect to said tangential extension of the radially outer edge of the friction material;

said at least one free surface of the disc facing surface of the supporting plate comprises a through opening edge at least partially delimiting a through opening in axial direction (X-X) through said supporting plate;

and wherein said at least one elastic device comprises a body comprising:

at least one connecting portion, configured to connect to the body of the brake caliper associable with said assembly; and at least one supporting portion, which rests against said through opening edge of the at least one free surface of the supporting plate, axially crossing said through opening of the supporting plate to apply an elastic biasing action directly in axial direction (X-X) to said through opening edge of said through opening.

2. The pad-and-spring assembly of claim 1, wherein said through opening edge is facing in radially outward direction.

3. The pad-and-spring assembly of claim 1, wherein said through opening edge delimits said through opening in radially inward direction.

4. The pad-and-spring assembly of claim 1, wherein said through opening edge comprises an arch-shaped resting length, so as to allow the at least one supporting portion of the at least one elastic device to rest in a minimum contact area, ideally coinciding with a single point of contact between the at least one elastic device and the through opening edge; and wherein said through opening edge is associated with a slide that extends between said plate back and said at least one free surface of the supporting plate, said slide being inclined with respect to the axial direction (X-X) by a predetermined inclination angle; and wherein said predetermined inclination angle is equal to an angle formed between said at least one supporting portion and an arm of the at least one elastic device; and wherein said slide is inclined towards the rotation axis of the brake disc associable with said assembly; and wherein said through opening is surrounded by an eyelet having a radially outward eyelet side, said eyelet being axially offset with respect to the plate back, forming a resting portion seat suitable for receiving a portion of said at least one supporting portion of the at least one elastic device.

5. The pad-and-spring assembly of claim 4, wherein said eyelet is axially offset towards the brake disc associable with said assembly, forming a resting portion seat suitable for receiving a portion of said at least one supporting portion of the at least one elastic device.

6. The pad-and-spring assembly of claim 1, wherein said friction material comprises at least one recess, so as to face said at least one free surface of the disc facing surface of the supporting plate, said at least one recess defining on said friction material at least one recess edge surface facing in radially outward direction and located at an innermost radial height than said tangential extension of the radially outer edge of the friction material; and wherein said through opening opens at said at least one recess; and wherein said at least one free surface of the supporting plate comprises an opening margin surface that at least partially surrounds said through opening edge.

7. The pad-and-spring assembly of claim 6, wherein said at least one free surface of the supporting plate comprises an opening margin surface that surrounds said through opening edge in the radially inward direction.

8. The pad-and-spring assembly of claim 1, wherein the body of said at least one elastic device a comprises at least one arm which extends in radial direction (R-R) between said at least one supporting portion and said at least one connecting portion of the body of the at least one elastic device; and wherein said at least one arm extends for at least one portion thereof either facing and/or in contact with said plate back of the supporting plate of the brake pad; and wherein said at least one arm of the at least one elastic device ends with a free end defining said at least one supporting portion; and wherein said free end defining said at least one supporting portion at least axially protrudes from said at least one arm; and wherein said free end protrudes in axial direction (X-X) from said at least one arm, forming an angle with said at least one arm; and said angle is greater than 90°.

9. The pad-and-spring assembly of claim 7, wherein said angle is equal to 135°.

10. The pad-and-spring assembly of claim 1, wherein said through opening is a through hole surrounded by a closed periphery;

or wherein said through opening is a through slot surrounded by an open periphery.

11. The pad-and-spring assembly of claim 9, wherein said open periphery of the through opening opens in the radially outward direction.

12. The pad-and-spring assembly of claim 1, wherein a radial dimension piston band is defined on said plate back of the supporting plate of the brake pad by radial dimension of a piston footprint;

said piston footprint defines an outer radial piston level coinciding with an extension parallel to the tangential direction on the plate back of the radial height of the piston footprint evaluated in the farthest point thereof from the rotation axis of the disc; and wherein said piston footprint defines an inner radial piston level coinciding with the extension parallel to the tangential direction (T-T) on the plate back of the radial height of the piston footprint evaluated in the closest point thereof to the rotation axis of the disc; and wherein said radial dimension piston band is delimited in radial direction by said outer radial piston level and said inner radial piston level; and wherein said through opening edge of the at least one free surface of the supporting plate of the brake pad on which said at least one supporting portion of the at least one elastic device rests is radially inside said outer radial piston level; and wherein piston footprint means one or more areas in which, during the braking action, a piston acts, either directly or indirectly, on the plate back of the supporting plate of brake pad.

13. The pad-and-spring assembly of claim 12, wherein said through opening edge of the at least one free surface of the supporting plate of the brake pad on which said at least one supporting portion of the at least one elastic device rests is included in said radial dimension piston band.

14. The pad-and-spring assembly of claim 1, wherein said at least one elastic device comprises a cross-shaped body, and at least two axially opposite arms, each arm ending with at least one supporting portion, so as to bias at least two opposite brake pads in the axial direction (X-X) away from the brake disc; so that said pad-and-spring assembly further comprises at least one further opposite brake pad so as to comprise a pair of opposite brake pads, configured to press against opposite braking surfaces of a brake disc associable with said assembly; and/or wherein said pad-and-spring assembly further comprises a separate elastic device, so as to comprise two elastic devices tangentially arranged side-by-side both acting with their supporting portions on a same brake pad and/or on a same pair of opposite brake pads.

15. A brake caliper for a disc brake comprising a caliper body, configured to be arranged straddling a brake disc associable with the brake caliper and at least one pad-and-spring assembly, wherein an axial direction (X-X) either coinciding with or parallel to a rotation axis of a brake disc of said disc brake, a radial direction (R-R) orthogonal to the axial direction (X-X), and a tangential direction (T-T) orthogonal to both the axial direction (X-X) and the radial direction (R-R) are defined, wherein said radial direction (R-R) defines a radially inward direction, directed towards the rotation axis of the brake disc, and a radially outward direction, opposite to the radial inward direction; said pad-and-spring assembly comprising:

at least one brake pad comprising friction material and a supporting plate which supports said friction material;

at least one elastic device, configured to apply an elastic biasing action directed in axial direction (X-X) to said at least one brake pad to move it away from the brake disc when a braking action ceases;

wherein:

said supporting plate comprises a disc facing surface disc, intimately associated with said friction material, and a plate back, axially opposite to said disc facing surface and configured to face thrust means of the brake caliper associable with said assembly;

said friction material comprises a radially inner edge, configured to face the rotation axis of the brake disc, and a radially outer edge, radially opposite to said radially inner edge;

said radially outer edge of the friction material defines an outer radial dimension level of the friction material with its tangential extension on said disc facing surface of the supporting plate;

said disc facing surface of the supporting plate comprises at least one free surface, free from contact with the friction material and configured to face a braking surface of the brake disc associable with said pad-and-spring assembly, wherein said at least one free surface is located radially inside with respect to said tangential extension of the radially outer edge of the friction material;

said at least one free surface of the disc facing surface of the supporting plate comprises a through opening edge at least partially delimiting a through opening in axial direction (X-X) through said supporting plate;

and wherein said at least one elastic device comprises a body comprising:

at least one connecting portion, configured to connect to the body of the brake caliper associable with said assembly; and at least one supporting portion, which rests against said through opening edge of the at least one free surface of the supporting plate, axially crossing said through opening of the supporting plate to apply an elastic biasing action directly in axial direction (X-X) to said through opening edge of said through opening.

16. The brake caliper of claim 15, further comprising thrust means configured to press at least one brake pad against opposite braking surfaces of the brake disc associable with said brake caliper; wherein said caliper body further comprises:

a pair of opposing elongated portions, each elongated portion configured to face, either directly or indirectly by at least one brake pad, one of the opposite braking surfaces of the brake disc associable with said brake caliper;

at least one caliper bridge, which connects said elongated portions together, said at least one caliper bridge being arranged straddling an associable disc brake; and wherein said at least one caliper bridge are at least three caliper bridges comprising at least one central bridge and at least one pair of side bridges, tangentially opposite to said central bridge, and wherein said at least three caliper bridges mutually delimit radial caliper body openings; and wherein said at least one connecting portion of the at least one elastic device is coupled to at least two caliper bridges, said at least one connecting portion being arranged inside said at least one radial caliper opening.

17. The brake caliper of claim 16, wherein said at least one connecting portion of the at least one elastic device is coupled to a central bridge and a side bridge.

* * * * *